US 7,894,971 B2

(12) United States Patent
Inoue et al.

(10) Patent No.: US 7,894,971 B2
(45) Date of Patent: Feb. 22, 2011

(54) VEHICLE CONTROL APPARATUS

(75) Inventors: Gen Inoue, Toyota (JP); Yasuhito Ishida, Toyokawa (JP)

(73) Assignees: Toyota Jidosha Kabushiki Kaisha, Toyota (JP); Advics Co., Ltd., Kariya-shi (JP)

( * ) Notice: Subject to any disclaimer, the term of this patent is extended or adjusted under 35 U.S.C. 154(b) by 1091 days.

(21) Appl. No.: 11/645,640

(22) Filed: Dec. 27, 2006

(65) Prior Publication Data
US 2007/0150158 A1 Jun. 28, 2007

(30) Foreign Application Priority Data

Dec. 28, 2005 (JP) .............................. 2005-377407
May 25, 2006 (JP) .............................. 2006-145675

(51) Int. Cl.
*B60T 8/32* (2006.01)
(52) U.S. Cl. .......................... 701/93; 701/84; 123/178; 123/350; 180/197
(58) Field of Classification Search .................. 701/67, 701/93, 110, 102, 51, 54, 84; 192/3.51; 123/350, 406.24, 352, 178–179; 180/170, 180/197
See application file for complete search history.

(56) References Cited

U.S. PATENT DOCUMENTS

| 4,735,273 | A | * | 4/1988 | Naito | ......................... | 180/179 |
| 4,814,991 | A | * | 3/1989 | Tada et al. | ..................... | 701/93 |
| 4,893,243 | A | * | 1/1990 | Tada et al. | ..................... | 701/94 |
| 5,003,482 | A | * | 3/1991 | Teratani et al. | ................ | 701/95 |
| 5,177,683 | A | * | 1/1993 | Oo et al. | ........................ | 701/93 |
| 5,260,876 | A | * | 11/1993 | Oo et al. | ........................ | 701/93 |
| 5,329,455 | A | * | 7/1994 | Oo et al. | ........................ | 701/93 |
| 5,646,850 | A | * | 7/1997 | Ishida et al. | ................... | 701/93 |

(Continued)

FOREIGN PATENT DOCUMENTS

DE 44 21 565 A1 12/1995

(Continued)

OTHER PUBLICATIONS

Evaluation of adaptive cruise control algorithms on a virtual test track; Donghoon Han; Kyongsu Yi; American Control Conference, 2006; Digital Object Identifier: 10.1109/ACC.2006.1657658.*

(Continued)

*Primary Examiner*—Cuong H Nguyen
(74) *Attorney, Agent, or Firm*—Oliff & Berridge, PLC

(57) ABSTRACT

A vehicle control apparatus is used to control a driving force to be given to a vehicle. A driving force calculating device calculates the driving force to be given to the vehicle, on the basis of a deviation between a vehicle speed of the vehicle and a target speed. A driving force correcting device performs correction of increasing the driving force calculated by the driving force calculating device, when the vehicle speed reduces to a predetermined value or less. Specifically, the driving force correcting device performs the correction of increasing the driving force, when the vehicle speed reduces to the predetermined value or less as the vehicle comes in contact with an obstacle, such as a bump. By this, it is possible to reduce a stop time length of the vehicle due to the contact with the obstacle, to thereby quickly make the vehicle run over the obstacle.

10 Claims, 15 Drawing Sheets

U.S. PATENT DOCUMENTS

| | | | |
|---|---|---|---|
| 5,731,977 | A | 3/1998 | Taniguchi et al. |
| 5,980,000 | A | 11/1999 | Kolbe et al. |
| 6,494,282 | B1 | 12/2002 | Hessmert et al. |
| 6,751,544 | B2 * | 6/2004 | Hashimoto et al. .......... 701/107 |
| 6,766,237 | B2 * | 7/2004 | Watanabe et al. ............. 701/51 |
| 7,561,954 | B2 * | 7/2009 | Aizawa et al. ................ 701/79 |
| 2004/0129470 | A1 | 7/2004 | Huelser et al. |
| 2004/0215385 | A1 * | 10/2004 | Aizawa et al. ................ 701/93 |
| 2007/0114084 | A1 | 5/2007 | Huelser et al. |

FOREIGN PATENT DOCUMENTS

| | | | |
|---|---|---|---|
| DE | 199 33 087 A1 | | 1/2001 |
| DE | 100 06 780 C 1 | | 9/2001 |
| FR | 2 813 050 A1 | | 2/2002 |
| JP | 62-015925 | * | 1/1987 |
| JP | A-01-153344 | | 6/1989 |
| JP | 3-150039 | * | 6/1991 |
| JP | B2-06-021641 | | 3/1994 |
| JP | A-06-249009 | | 9/1994 |
| JP | A 8-133043 | | 5/1996 |
| JP | A-08-200111 | | 8/1996 |
| JP | A 9-020161 | | 1/1997 |
| JP | A-11-078597 | | 3/1999 |
| JP | P2002-186729 | * | 6/2002 |
| JP | 2002-250997 | * | 8/2002 |
| JP | A-2003-092803 | | 3/2003 |
| JP | A 2004-090679 | | 3/2004 |
| JP | A-2004-332639 | | 11/2004 |
| KR | 9006594 B | * | 9/1990 |
| WO | WO 03/051663 A1 | | 6/2003 |

OTHER PUBLICATIONS

Automatic cruise control modeling- a lattice PWL approximation approach; Junaid, K.M.; Shuning Wang; Intelligent Transportation Systems Conference, 2006. ITSC '06. IEEE; Digital Object Identifier: 10.1109/ITSC.2006.1707414 Publication Year: 2006, pp. 1370-1375.*

Intelligent cruise control stop and go with and without communication; Acarman, T.; Yiting Liu; Ozguner, U.; American Control Conference, 2006; Digital Object Identifier: 10.1109/ACC.2006.1657404.*

Evaluation of Integrated ACC(Adaptive Cruise Control)/CA(Collision Avoidance) on a Virtual Test Track; Donghoon Han; Kyongsu yi; Seungjong Yi; SICE-ICASE, 2006. International Joint Conference'; Digital Object Identifier: 10.1109/SICE.2006.315564; Publication Year: 2006, pp. 2127-2132.*

En-route Security Monitoring Based on an Incident Detection Algorithm for Commercial Vehicles; Hao Wang; Ruey Cheu; Der-Horng Lee; Fuzzy Systems and Knowledge Discovery, 2009. FSKD '09. Sixth International Conference on; vol. 3 Digital Object Identifier: 10.1109/FSKD.2009.783 ; Publication Year: 2009, pp. 276-281.*

Control and operation of PM synchronous motor drives in the field-weakening region; Krishnan, R.; Industrial Electronics, Control, and Instrumentation, 1993. Proceedings of the IECON '93., International Conference on; Digital Object Identifier: 10.1109/IECON.1993.338988; Publication Year: 1993, pp. 745-750 vol. 2.*

Putting electronics to work in the 1991 car models; Jurgen, R.K.; Spectrum, IEEE; vol. 27, Issue: 12; Digital Object Identifier: 10.1109/6.60944; Publication Year: 1990, pp. 72-75.*

Effect of transmission design on Electric Vehicle (EV) performance; Ren, Q.; Crolla, D.A.; Morris, A.; Vehicle Power and Propulsion Conference, 2009. VPPC '09. IEEE; Digital Object Identifier: 10.1109/VPPC.2009.5289707; Publication Year: 2009, pp. 1260-1265.*

Design considerations for induction machines for electric vehicle drives; Harson, A.; Mellor, P.H.; Howe, D.; Electrical Machines and Drives, 1995. Seventh International Conference on (Conf. Publ. No. 412); Publication Year: 1995, pp. 16-20.*

An intelligent driver warning system for vehicle collision avoidance; An, P.E.; Harris, C.J.; Systems, Man and Cybernetics, Part A: Systems and Humans, IEEE Transactions on; vol. 26, Issue: 2; Digital Object Identifier: 10.1109/3468.485752 Publication Year: 1996, pp. 254-261.*

HEV system EMC investigation during transient operations; Nelson, Jody J.; Aidam, Martin; Electromagnetic Compatibility, 2007. EMC Zurich 2007. 18th International Zurich Symposium on; Digital Object Identifier: 10.1109/EMCZUR.2007.4388231 Publication Year: 2007, pp. 205-208.*

Fuzzy control of clutch for automatic mechanical transmission vehicle starting; Xianping Xie; Xudong Wang; Xun Zhang; Tengwei Yu; Vehicle Power and Propulsion Conference, 2008. VPPC '08. IEEE; Digital Object Identifier: 10.1109/VPPC.2008.4677445; Publication Year: 2008, pp. 1-4.*

* cited by examiner

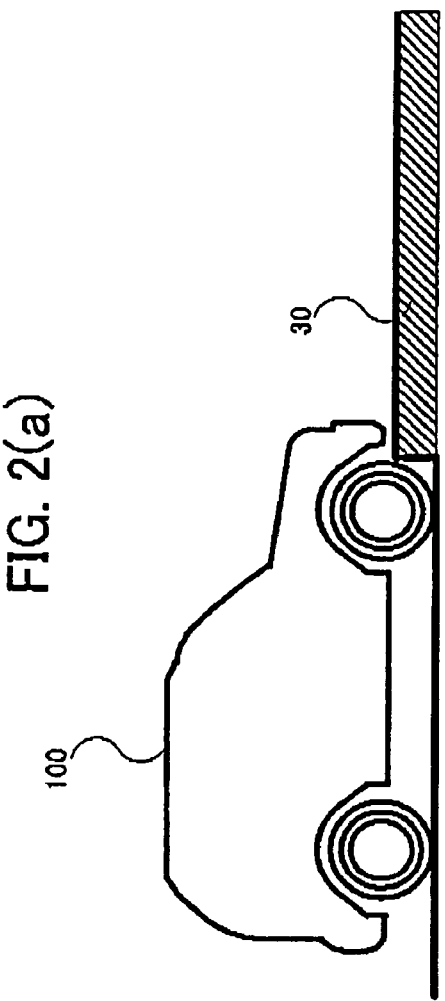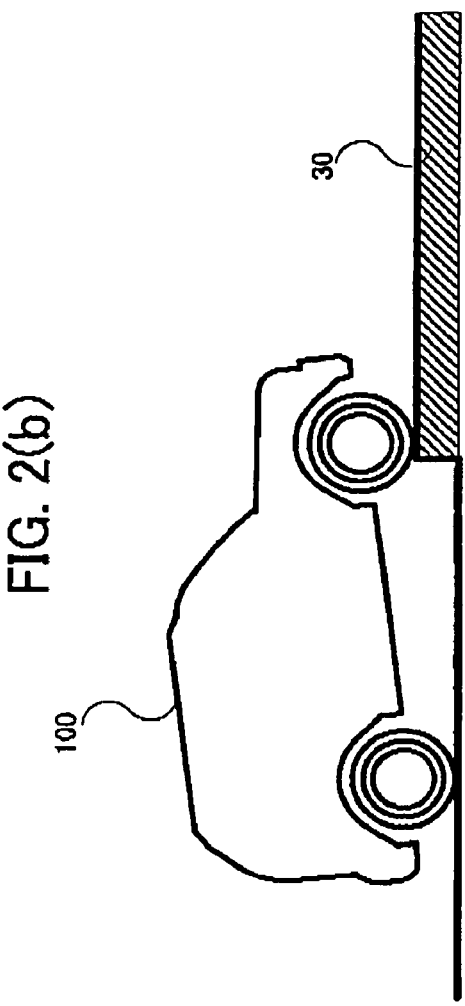

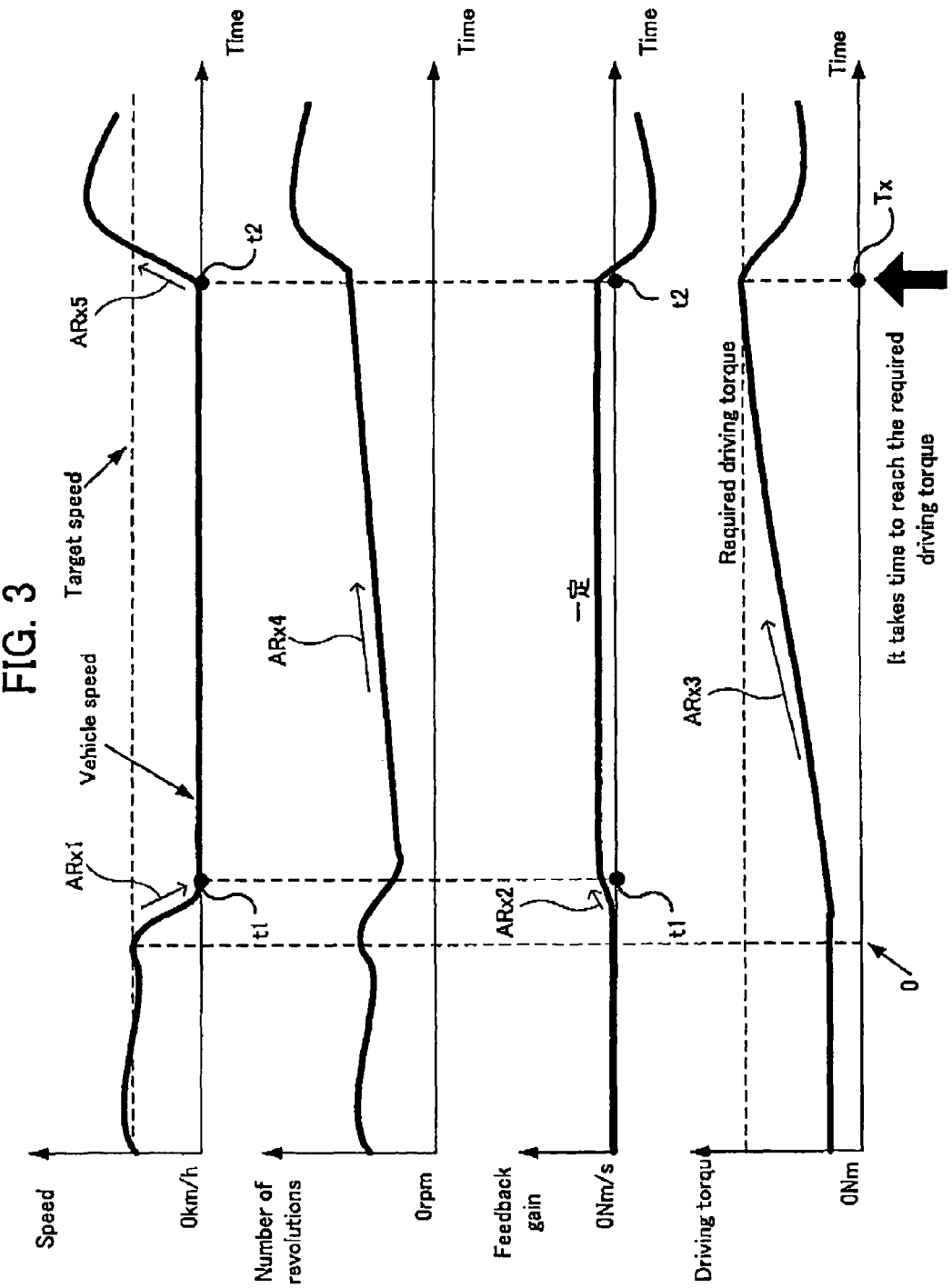

VEHICLE CONTROL APPARATUS

BACKGROUND OF THE INVENTION

1. Field of the Invention

The present invention relates to a vehicle control apparatus for controlling a driving force to be given to a vehicle.

2. Description of the Related Art

There is a conventional technology of controlling a driving force or a braking force, which is given to a vehicle, in order to set a vehicle speed to a desired speed (target speed). For example, Japanese Patent Application Laid Open NO. 2004-90679 discloses a technology in which an amount of increasing the driving force is increased more as a deviation between the vehicle speed and the target speed becomes larger, on a drive control apparatus for controlling the driving force (or driving torque) so as to make the vehicle speed close to the target speed.

Moreover, there is also a conventionally known technology of controlling the driving torque (or driving force) and breaking torque (breaking force) when the vehicle runs on a slope or the like. For example, the above-mentioned Japanese Patent Application Laid Open NO. 2004-90679 discloses a creep drive control apparatus on which gain for determining an increasing rate per unit time of the driving torque, which is given to the vehicle, is set to have an optimum value, on the basis of feedback control (automatic control) in which the deviation between the vehicle speed and the target speed is an input value and on which the vehicle speed is controlled in a constant range.

However, in the above-mentioned Japanese Patent Application Laid Open NO. 2004-90679, considering the case where the vehicle runs at a low speed (or extremely low speed), such as off road running, for example, driving forward over a bump from the stop condition that the vehicle stops in contact with the bump, requires the larger driving torque in a moment, though the gain for increasing the driving torque is set at a low level because the target speed is low and thus the deviation is small. Thus, there are such technical problems that it takes a long time for the vehicle to make the driving torque reach the driving torque required to drive forward over the bump, and that a driver feels something is wrong and misunderstands it is a failure.

In other words, in the technique described in the above-mentioned Japanese Patent Application Laid Open NO. 2004-90679, it takes a time to run over the bump if the vehicle stops on the bump or the like, in some cases. This is because if the target speed is set to be relatively low when the vehicle stops on the bump or the like, the small deviation between the vehicle speed and the target speed reduces the amount of increasing the driving force.

SUMMARY OF THE INVENTION

In order to solve the above-mentioned problems, it is therefore an object of the present invention to provide (i) a vehicle control apparatus capable of more properly increasing the driving torque on the basis of a running condition including the stop condition, for example, when the vehicle runs at a low speed, such as the off road running, for example, and (ii) a vehicle control apparatus capable of giving the driving force large enough for the vehicle to run over an obstacle, such as the bump, in a short time.

The above object of the present invention can be achieved by a vehicle control apparatus for controlling a driving force to be given to a vehicle, the vehicle control apparatus provided with: a driving force calculating device for calculating the driving force to be given to the vehicle, on the basis of a deviation between a vehicle speed of the vehicle and a target speed; and a driving force correcting device for performing correction of increasing the driving force calculated by the driving force calculating device, when the vehicle speed reduces to a predetermined value or less.

The above-mentioned vehicle control apparatus is an apparatus for controlling the driving force to be given to the vehicle. The driving force calculating device calculates the driving force to be given to the vehicle, on the basis of the deviation between the vehicle speed of the vehicle and the target speed. The driving force correcting device performs the correction of increasing the driving force calculated by the driving force calculating device, when the vehicle speed reduces to the predetermined value or less. For example, if the vehicle comes in contact with an obstacle, such as a bump, the vehicle speed reduces to the predetermined value or less. Namely, the driving force correcting device performs the correction of increasing the driving force if the vehicle comes in contact with the obstacle. By this, according to the above-mentioned vehicle control apparatus, it is possible to reduce a stop time length of the vehicle due to the contact with the obstacle, to thereby quickly make the vehicle run over the obstacle.

In one aspect of the above-mentioned vehicle control apparatus, the driving force correcting device performs the correction of increasing the driving force when the vehicle speed reduces to almost "0". In this case, the driving force correcting device can perform the correction of increasing the driving force when the vehicle stops in contact with the obstacle, such as the bump.

In another aspect of the above-mentioned vehicle control apparatus, the driving force correcting device calculates an amount of correcting the driving force, on the basis of a vehicle acceleration of the vehicle.

In this aspect, the driving force correcting device sets the amount of correcting the driving torque, on the basis of the extent in reduction of the vehicle speed (i.e. the extent of an absolute value of the vehicle acceleration) when the vehicle speed reduces to almost "0". By this, it is possible to correct the driving force in accordance with the condition of the obstacle's height and shape or the like. Therefore according to the above-mentioned vehicle control apparatus, without an influence of the obstacle's condition, it is possible to give the driving torque that allows the vehicle to certainly run over the obstacle.

In another aspect of the above-mentioned vehicle control apparatus, the driving force correcting device performs correction of reducing the driving force, when the vehicle speed reaches the target speed by performing the correction of increasing the driving force. By this, it is possible to prevent the vehicle speed from greatly exceeding the target speed after the vehicle runs over the obstacle or the like. In other words, it is possible to maintain the vehicle speed at the target speed, immediately after the vehicle runs over the obstacle or the like.

Preferably, the driving force correcting device can set an amount of correcting the driving force to "0", when the vehicle speed reaches the target speed by performing the correction of increasing the driving force.

More preferably, the driving force calculating device can make an amount of increasing the driving force, larger as the deviation between the vehicle speed and the target speed becomes larger, if the vehicle speed is less than the target speed.

Moreover, the above object of the present invention can be also achieved by a vehicle control apparatus provided with: a measuring device (vehicle speed sensor) for measuring a vehicle speed of a vehicle; a gain setting device (ECU, torque sensor, engine) for setting gain of driving torque which is given to the vehicle, on the basis of the measured vehicle speed; a running condition judging device (ECU, vehicle speed sensor, revolution sensor) for judging a running condition (low revolution condition, back condition) of the vehicle, including a stop condition in which the vehicle stops in contact with a bump; and a gain controlling device (ECU, torque sensor, engine) for changing the gain, on the basis of the judged running condition.

According to the vehicle control apparatus of the present invention, the vehicle speed is measured by the measuring device, such as a vehicle sensor, for example. Simultaneously with or in tandem with this, the gain of the driving torque which is given to the vehicle is set, on the basic of the measured speed, by the gain setting device provided with an ECU (Engine Control Unit), a torque sensor, or the like, for example. Simultaneously with or in tandem with this, the running condition of the vehicle is judged, including the stop condition in which the vehicle stops in contact with the bump (or a low revolution condition and a back revolution condition, described later), by the running condition judging device provided with the ECU, the vehicle speed sensor, a revolution sensor, or the like, for example. Simultaneously with or in tandem with this, the gain is changed on the basis of the judged running condition, by the gain controlling device provided with the ECU, the torque sensor, or the like, for example. Here, the gain is to determine an increasing rate per unit time of the driving torque which is given to the vehicle.

If the gain of the driving torque is not changed on the basis of the running condition including the stop condition, for example, it takes a long time to reach the driving torque required to run over the bump.

More specifically, when the vehicle runs at a low speed, such as off road running, for example, in the stop condition that the vehicle stops in contact with the bump, driving forward over the bump from the stop condition, requires the larger driving torque in a moment, though the gain for increasing the driving torque is set at a low level because the target speed is low and thus the deviation is small. Thus, there are such technical problems that it takes a long time for the vehicle to make the driving torque reach the driving torque required to drive forward over the bump, and that a driver feels something is wrong and misunderstands it is a failure.

In contrast, according to the vehicle control apparatus in the present invention, the gain of the driving torque is changed, on the basis of the running condition, such as the stop condition, for example. More specifically, the gain is set to a higher level than the normal level if it is judged by the running condition judging device that the vehicle is in the stop condition that the vehicle stops in contact with the bump, for example. As a result, according to the vehicle control apparatus in the present invention, it is possible to make the time length shorter that the driving torque is reached to the driving torque required to drive forward over the bump, for example. Consequently, it is possible to make the time length that the vehicle runs over the bump, shorter, and make a driver feel a smooth and comfortable drive.

In one aspect of the vehicle control apparatus of the present invention, it is further provided with a target speed setting device (ECU, vehicle speed sensor) for setting a target speed of the vehicle, the gain setting device setting the gain on the basis of feedback control (automatic control) in which a deviation between the measured vehicle speed and the target speed is an input value.

According to this aspect, the gain setting device can set the gain, more highly accurately, on the basis of the feedback control.

In another aspect of the vehicle control apparatus of the present invention, the gain controlling device increases the gain on the basis of the judged running condition.

According to this aspect, in the vehicle of the present invention, it is possible to make the time length shorter that the driving torque is reached to the driving torque which is at a higher level than the normal level and which is required to drive forward over the bump, for example.

In another aspect of the vehicle control apparatus of the present invention, it is further provided with a number of revolutions measuring device for measuring the number of engine revolutions of the vehicle, the running condition judging device further judging whether the vehicle is (i) in a low revolution condition in which the measured number of engine revolutions is lower than predetermined number of revolutions, or (ii) in a back condition in which the vehicle moves backward, as the running condition.

According to this aspect, if it is judged by the running condition judging device that the vehicle is in the low revolution condition or the back condition, the gain is changed by comparing to the normal level by the gain controlling device. As a result, according to the vehicle control apparatus of the present invention, it is possible to make the time length shorter that the driving torque is reached to the driving torque required to drive forward over the bump, for example.

In another aspect of the vehicle control apparatus of the present invention, it is further provided with an acceleration judging device for performing acceleration judgment of whether or not a driver of the vehicle performs an acceleration operation, the gain controlling device further increasing the gain on the basis of the acceleration judgment.

According to this aspect, if it is judged by the acceleration judging device that the driver performs the acceleration operation, such as stepping on an accelerator pedal, the gain is increased, as compared to the normal gain, by the gain controlling device. As a result, according to the vehicle control apparatus of the present invention, it is possible to make the time length shorter that the driving torque is reached to the driving torque required to drive forward over the bump, in an acceleration condition which is the running condition that the vehicle accelerates, for example.

In another aspect of the vehicle control apparatus of the present invention, the running condition judging device judges whether or not the vehicle is in the stop condition, and the gain controlling device increases the gain by a first ratio if it is judged that the vehicle is in the stop condition.

According to this aspect, in the vehicle, it is possible to make the time length shorter that the driving torque is reached to the driving torque required to drive forward after transition from the stop condition, on the basis of the gain increased only by the first ratio, which can be defined in accordance with the stop condition.

In another aspect of the vehicle control apparatus of the present invention, it is further provided with a number-of-revolutions measuring device for measuring the number of engine revolutions of the vehicle, the running condition judging device judging whether the vehicle is in a low revolution condition in which the measured number of engine revolutions is lower than predetermined number of revolutions, the gain controlling device further increasing the gain by a second ratio if it is judged that the vehicle is in the low revolution condition.

According to this aspect, in the vehicle, it is possible to make the time length shorter that the driving torque is reached to the driving torque required to drive forward after transition from the low revolution condition, on the basis of the gain increased only by the second ratio, which can be defined in accordance with the low revolution condition, in addition to the above-mentioned first ratio.

In another aspect of the vehicle control apparatus of the present invention, the running condition judging device judges whether the vehicle is in a back condition in which the vehicle moves backward, and the gain controlling device further increases the gain by a third ratio if it is judged that the vehicle is in the back condition.

According to this aspect, in the vehicle, it is possible to make the time length shorter that the driving torque is reached to the driving torque required to drive forward after transition from the back condition, on the basis of the gain increased only by the third ratio, which can be defined in accordance with the back condition, in addition to the above-mentioned first or second ratio.

In another aspect of the vehicle control apparatus of the present invention, the vehicle is provided with a plurality of wheels, and the running condition judging device judges that the vehicle is in the stop condition (i) if the vehicle speed is equal to almost zero, or (ii) if at least one of the plurality of wheels is reversed in rotation.

According to this aspect, the running condition judging device can judge the stop condition, more properly and quickly.

In another aspect of the vehicle control apparatus of the present invention, the gain controlling device increases the gain on the basis of the number of engine revolutions of the vehicle.

According to this aspect, the gain controlling device cab increase the gain, more highly accurately, on the basis of a function and map information or the like, which indicate a correlation between the number of engine revolutions of the vehicle and the gain, for example.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 2 are schematic diagrams schematically showing the situation that the vehicle in the embodiment drives over a bump;

FIG. 3 is a timing chart to explain the basic concept of a driving torque control method of increasing driving torque to the driving torque necessary for a general vehicle to run over the bump;

DETAILED DESCRIPTION OF THE PREFERRED EMBODIMENTS

Hereinafter, the preferred embodiments of the present invention will be explained with reference to the drawings.

(1) Basic Structure of Vehicle

Figure 1:
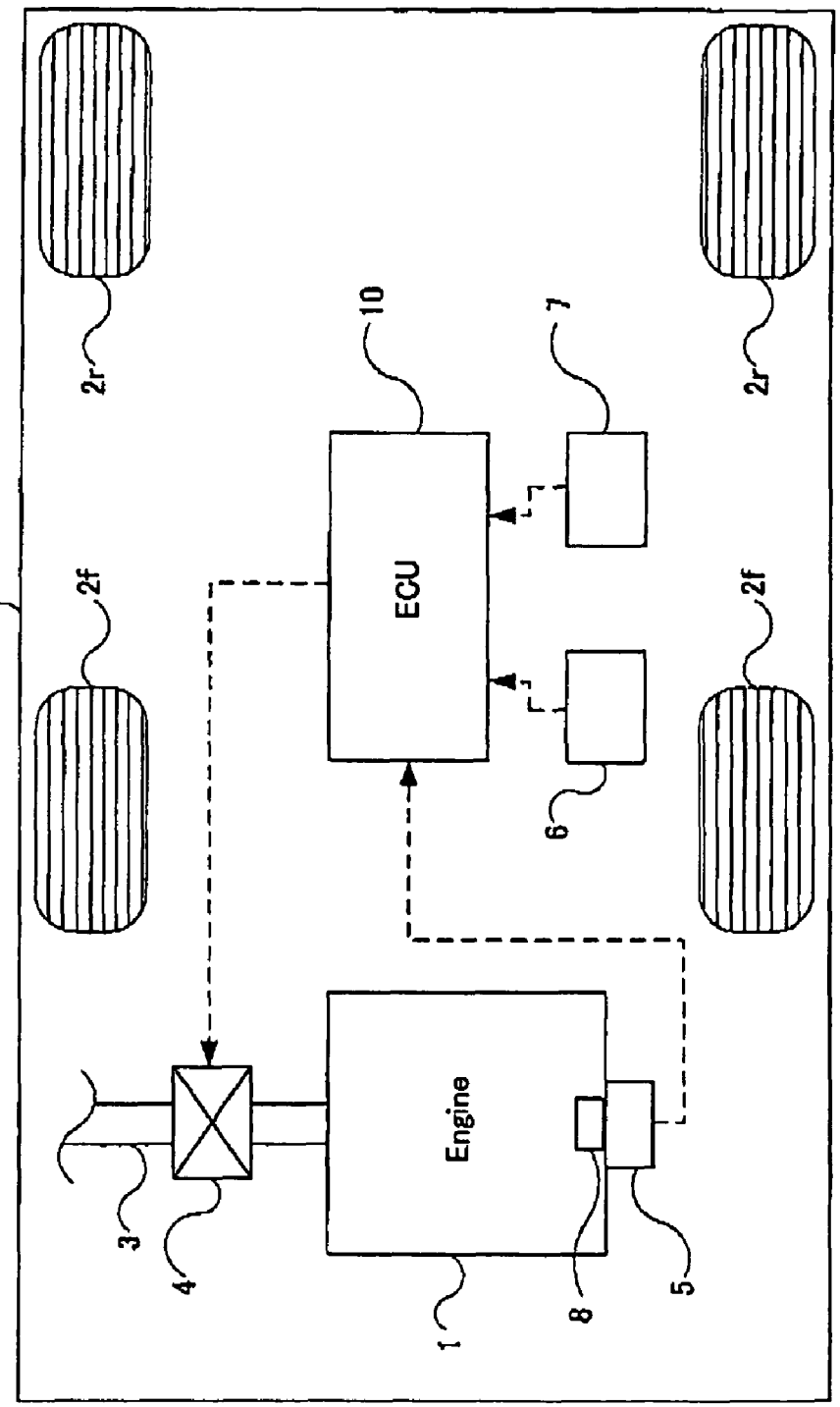
FIG. 1 is a schematic diagram showing the outline structure of a vehicle in an embodiment.

Firstly, with reference to FIG. 1, an explanation will be given for the outline structure of a vehicle to which a vehicle control apparatus in an embodiment of the present invention is applied. FIG. 1 is a schematic diagram showing the outline structure of a vehicle 100 in the embodiment. Incidentally, FIG. 1 is a diagram in which the vehicle 100 is observed from the top, the left shows the front of the vehicle 100, and the right shows the rear of the vehicle 100. Moreover, arrows in dashed lines in FIG. 1 indicate the input/output of signals.

The vehicle 100 is provided mainly with: an engine (internal combustion engine) 1; front wheels 2, rear wheels 2r; a throttle valve 4; a torque sensor 5 (i.e. the gain setting device of the present invention, or one specific example of the gain setting device); a vehicle speed sensor 6 (i.e. one specific example of the measuring device of the present invention); an acceleration sensor (G sensor) 7; a revolution sensor 8 for measuring the number of engine revolutions (i.e. one specific example of the number-of-revolutions measuring device of the present invention); and an ECU (Engine Control Unit) 10 (i.e. the gain setting device of the present invention, or another specific example of the gain setting device). Incidentally, the vehicle in the embodiment may be further provided with a break apparatus and a break system, which operate cooperatively with various apparatuses for stabilizing the running of the vehicle, such as an ABS (Antilock Braking System) and a VSC (Vehicle Stability Control) apparatus, for example.

The engine 1 is an internal combustion engine for generating power by exploding an air-fuel mixture in a combustion chamber. The power generated by the engine 1 is transmitted to at least any of the front wheels 2f and the rear wheels 2r, through a torque converter, a transmission, and a drive shaft or the like, which are not illustrated.

Moreover, air is supplied to the engine 1 through an intake channel 3. The throttle valve 4 disposed in the middle of the intake channel 3 is a valve for adjusting the amount of the air supplied to the engine 1. Incidentally, the throttle valve 4 is controlled by the ECU 10.

The torque sensor 5 detects driving torque outputted from the engine 1, and the vehicle speed sensor 6 detects the speed (vehicle speed) of the vehicle 100. Moreover, the acceleration sensor 7 detects the acceleration of the vehicle 100, and also detects the slope gradient (inclination of the slope) of the currently driving road. The detected values are outputted to the ECU 10, as detection signals.

The ECU 10 has a CPU (Central Processing Unit), a ROM (Read Only Memory), a RAM (Random Access Memory), an A/D converter, an input/output interface, or the like. The ECU 10 performs a judgment process and a control process, on the basis of the detection signals supplied from the various sensors described above. In the embodiment, the ECU 10 performs the judgment process of judgment the running condition of the vehicle 10 including a stop condition and a back condition, described later, on the basis of the detection signals, and also performs the control process of controlling the gain of the driving torque which is given to the vehicle 100, on the basis of the result of the judgment process. As described above, the ECU 10 may also function as the running condition judging device.

(2) Driving Torque Control Method to Run Over Bump

Next, with reference to FIG. 2 to FIG. 4, an explanation will be given for the driving torque control method for ruing over the bump, in the embodiment.

(2-1) Relationship Between Stop Condition Caused by Bump and Driving Torque

Firstly, with reference to FIG. 2, a relationship between the stop condition caused by a bump and the driving torque will be explained. FIG. 2 are schematic diagrams schematically showing the situation that the vehicle 100 in the embodiment drives over a bump 30. Incidentally, in FIG. 2, it is assumed that the vehicle 100 runs from the left to the right. Moreover, the bump 30 is not limited to the one on a general road, and also includes so-called obstacles, such as stones, which continuously exist or appear on an off road.

As shown in FIG. 2(*a*), when the vehicle 100 in the embodiment comes in contact with the bump 30, the vehicle speed once becomes almost "0". After that, the vehicle 100 increases the driving torque to run over the bump 30. Then, as shown in FIG. 2(*b*), as a result of the increase in the driving torque, at the time point of reaching the driving torque necessary for the vehicle 100 to run over the bump 30, the vehicle speed substantially increases from "0", and the vehicle 100 starts to run over the bump 30.

Hereinafter, an explanation will be given for the driving torque control method of more quickly and accurately increasing the driving torque to the driving torque necessary for the vehicle 100 in the embodiment to run over the bump 30.

(2-2) Basic Concept of General Driving Torque Control Method

Firstly, with reference to FIG. 3, an explanation will be given for the basic concept of the driving torque control method of increasing the driving torque to the driving torque necessary for a general vehicle to run over the bump 30. FIG. 3 is a timing chart to explain the basic concept of the driving torque control method of increasing the driving torque to the driving torque necessary for the general vehicle to run over the bump.

Incidentally, a time point "t1" indicates the time point that the vehicle stops. A time point "t2" indicates the time point that the vehicle starts to run forward. A time point "Tx" indicates the time point that the required driving torque is reached, in a comparison example. Moreover, the horizontal axis indicates time, and the horizontal axis indicates the vehicle speed, in a first graph from the top in FIG. 3. The horizontal axis indicates time, and the horizontal axis indicates the number of engine revolutions, in a second graph from the top in FIG. 3. The horizontal axis indicates time, and the horizontal axis indicates the gain based on the feedback of the driving torque, in a third graph from the top in FIG. 3. The horizontal axis indicates time, and the horizontal axis indicates the driving torque, in a fourth graph from the top in FIG. 3. Moreover, in the embodiment, it is assumed that a time reference "0" is the time that the vehicle speed starts to reduce.

Firstly, as shown in the first graph in FIG. 3, by that the vehicle 100 comes in contact with the bump 30, the vehicle speed, which is maintained to almost a constant speed (a constant vehicle speed), reduces as shown by an arrow ARx1, and becomes almost "0" between the time point "0" and the time point "t1". This stop condition corresponds to the condition shown by FIG. 2(*a*) described above. Then, until the vehicle 100 runs over the bump 30, as shown in the first graph in FIG. 3, the condition that the vehicle speed is almost "0" continues. In this case, in order to run over the bump 30, the vehicle 100 increases the gain on the basis of the feedback control (automatic control) in which a deviation between the measured vehicle speed and the vehicle's target speed is an input value, as shown by an arrow ARx2, and sets the gain value at a substantially constant level. Then, the vehicle 100 increases the driving torque determined on the basis of the set gain, as shown by an arrow ARx3, between the time point "t1" and the time point "t2". After that, the increased driving torque can be reached to the driving torque required to run over the bump 30, at the time point "Tx". In addition, as shown by an arrow ARx4 in the second graph in FIG. 3, the number of engine revolutions also increases. Then, if the vehicle starts to run over the bump at the time point "t2", as shown by an arrow ARx6, the vehicle speed increases from almost "0". The condition that the vehicle starts to run over the bump corresponds to the condition shown in FIG. 2(*b*) described above. Simultaneously with or in tandem with this, the gain reduces, as shown in the third graph in FIG. 3, and the driving torque also reduces, as shown in the fourth graph in FIG. 3. In addition, as shown in the second graph in FIG. 3, the number of engine revolutions increases.

As described above, in a general driving torque control method, the gain for determining an increasing rate per unit time of the driving torque is set to have an optimum value in the normal drive, i.e. in such a drive that a special running condition, such as the above-mentioned stop condition, is not assumed, on the basis of the feedback control (automatic control) in which the deviation between the measured vehicle speed and the target speed is an input value. However, when the vehicle runs at a low speed, such as off road running, for example, driving forward over the bump from the stop condition that the vehicle stops in contact with the bump, requires the larger driving torque in a moment, though the gain for increasing the driving torque is set at a low level because the target speed is low and thus the deviation is small. Thus, it takes a long time for the vehicle to make the driving torque reach the driving torque required to drive forward over the bump, and a driver feels something is wrong and misunderstands it is a failure.

(2-3) Basic Concept of Driving Torque Control Method in Embodiment

Next, with reference to the above-mentioned FIG. 3, as occasion demands, in addition to FIG. 4, an explanation will be given for the basic concept of the driving torque control method of more quickly increasing the driving torque to the driving torque (or another driving torque) necessary for the vehicle in the embodiment to run over the bump 30. FIG. 4 is a timing chart to explain the basic concept of the driving torque control method of more quickly increasing the driving torque to the driving torque necessary for the vehicle in the embodiment to run over the bump 30. Incidentally, the time point "t1" indicates the time point that the vehicle stops. The time point "t2" indicates the time point that the vehicle starts to run forward. A time point "Ta" indicates the time point that the required driving torque is reached, in the embodiment. Moreover, the horizontal axis and the vertical axis in a plurality of graphs in FIG. 4 are the same as those in FIG. 3 described above, so that the explanation thereof will be omitted, as occasion demands.

Figure 4:
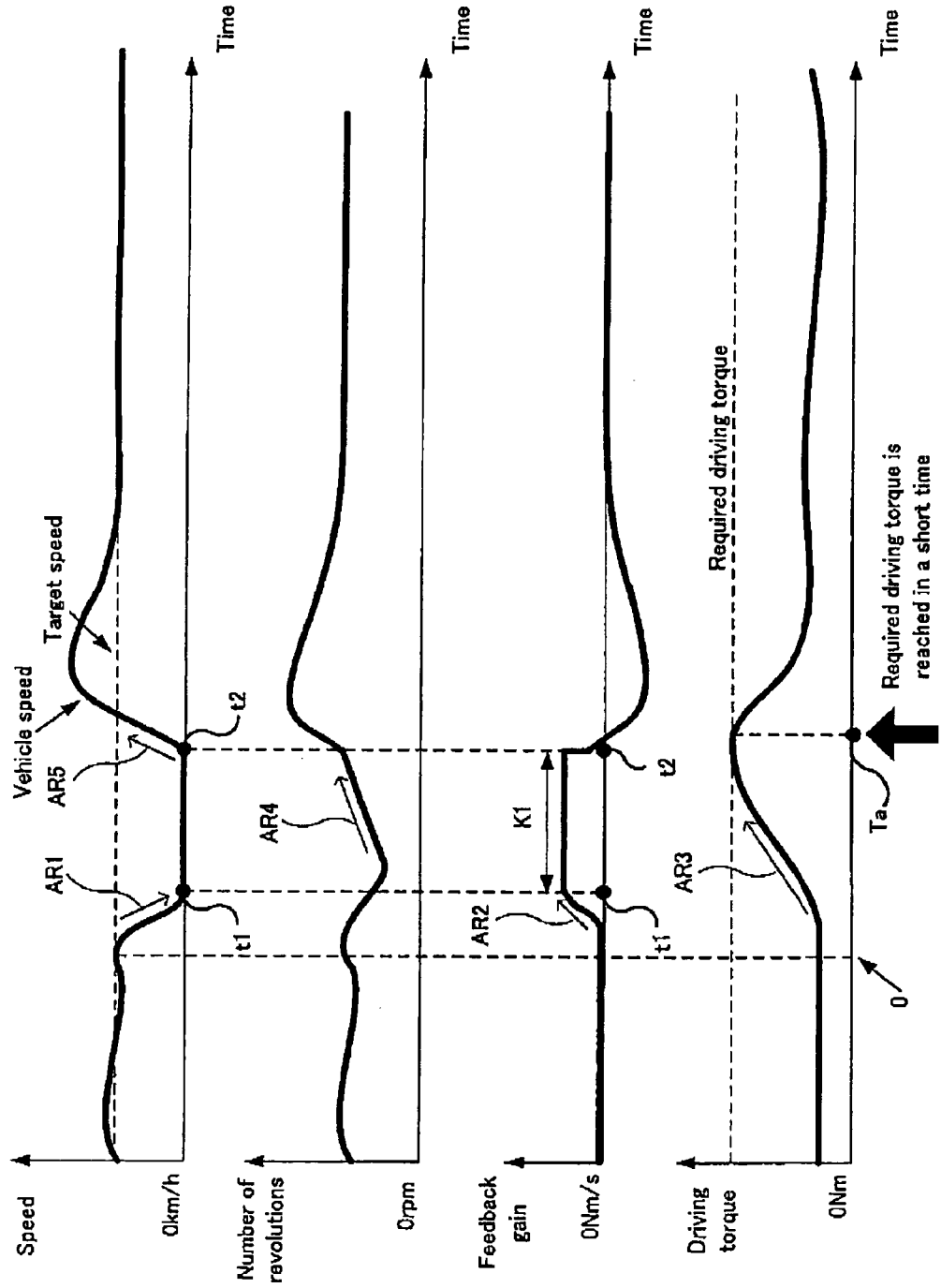
FIG. 4 is a timing chart to explain the basic concept of a driving torque control method of more quickly increasing the driving torque to the driving torque necessary for the vehicle in the embodiment to run over the bump.

Firstly, as shown in the first graph in FIG. 4, by that the vehicle 100 comes in contact with the bump 30, the vehicle speed, which is maintained to almost a constant speed, reduces as shown by an arrow AR1, and becomes almost "0" between the time point "0" and the time point "t1". This stop condition corresponds to the condition shown by FIG. 2(a) described above. Then, until the vehicle 100 runs over the bump 30, as shown in the first graph in FIG. 4, the condition that the vehicle speed is almost "0" continues from the time point "t1". Specifically, from the fact that the vehicle speed is maintained to almost "0" though a certain degree of driving torque is given to the vehicle, it can be judged that the vehicle 100 is in the stop condition that it stops in contact with the bump. In this case, in order to run over the bump 30, the vehicle 100 increases the gain on the basis of the feedback control (automatic control) in which the deviation between the measured vehicle speed and the vehicle's target speed is an input value, as shown by an arrow AR2.

In particular, in the driving torque control method in the embodiment, the gain value is set to the gain at a higher level, obtained by multiplying the normal gain, which is set on the basis of the above-mentioned feedback control by a predetermined coefficient, in the case that the vehicle is in the stop condition. Incidentally, the predetermined coefficient may be a coefficient "K1" described later (wherein "K1" is greater than "1"). Then, the vehicle 100 increases the driving torque determined on the basis of the set gain, as shown by an arrow AR3, between the time point "t1" and the time point "t2". After that, the increased driving torque can be reached to the driving torque required to run over the bump 30, at the time point "Ta". In addition, as shown by an arrow AR4 in the second graph in FIG. 4, the number of engine revolutions also increases. Then, if the vehicle starts to run over the bump at the time point "t2", as shown by an arrow AR5, the vehicle speed increases from almost "0". The condition that the vehicle starts to run over the bump corresponds to the condition shown in FIG. 2(b) described above. Simultaneously with or in tandem with this, the gain reduces, as shown in the third graph in FIG. 4, and the driving torque also reduces, as shown in the fourth graph in FIG. 4. In addition, as shown in the second graph in FIG. 4, the number of engine revolutions increases.

As described above, according to the driving torque control method in the embodiment, the vehicle changes the gain of the driving torque to a higher level, on the basis of the running condition, such as the stop condition, for example.

As shown in FIG. 3 described above, when the vehicle runs at a low speed, such as the off road running, for example, if the vehicle maintains the gain of the driving torque at a low level, on the basis of the normal feedback control, it takes a long time to reach the driving torque required to run over the bump. Specifically, when the vehicle runs at a low speed, such as the off road running, for example, in the stop condition that the vehicle stops in contact with the bump, driving forward over the bump from the stop condition, requires the larger driving torque in a moment, though the gain for increasing the driving torque is set at a low level because the target speed is low and thus the deviation is small. Thus, there are such technical problems that it takes a long time (refer to the time point "Tx" in the fourth graph in FIG. 3) for the vehicle to make the driving torque reach the driving torque required to drive forward over the bump, and that a driver feels something is wrong and misunderstands it is a failure.

In contrast, according to the driving torque control method in the embodiment, the vehicle changes the gain of the driving torque to a higher level than the normal level, on the basis of the running condition, such as the stop condition, for example. Specifically, under the control of the ECU, the vehicle sets the gain to a higher level if it is judged that the vehicle is in the stop condition that the vehicle stops in contact with the bump, for example. As a result, under the control of the ECU, it is possible to make the time length shorter that the driving torque is reached to the driving torque required to drive forward over the bump, for example. Consequently, it is possible to make the time length that the vehicle runs over the bump, shorter (refer to the time point "Ta" in the fourth graph in FIG. 4), and make a driver feel a smooth and comfortable drive.

(2-4) Driving Torque Control Process in Embodiment

Figure 5:
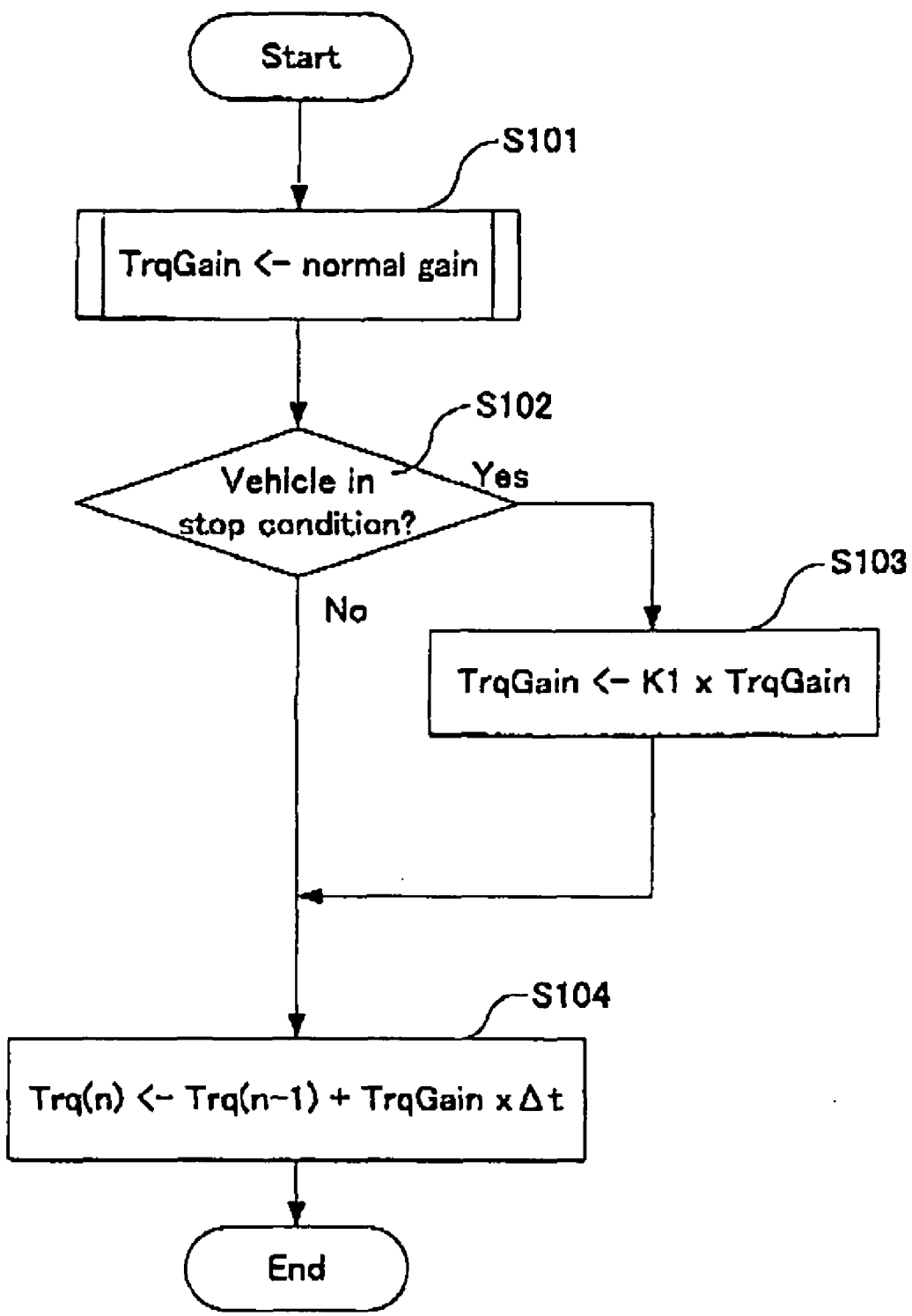
FIG. 5 is a flowchart showing one specific example of a driving torque control process in the embodiment.

Next, with reference to FIG. 5, one specific example of the driving torque control process in the embodiment will be explained. FIG. 5 is a flowchart showing one specific example of the driving torque control process in the embodiment. Incidentally, a coefficient "K1" is to increase the gain set under the assumption of the stop condition. The coefficient "K1" may be determined on the basis of map information defined by the height of the bump, a gear ratio of a transmission, a vehicle weight, and the tire diameter of the wheels (the front wheels 2f and the rear wheels 2r), theoretically, experimentally, experientially and by simulation or the like. Moreover, a variable "TrqGain" indicates the gain of the driving torque which is given to the vehicle. A variable "Trq(n)" indicates the driving torque which is given to the vehicle in the "n"-th predetermined time interval. A variable "Trq(n−1)" indicates the driving torque which is given to the vehicle in the "n−1"-th predetermined time interval. A constant "Δt" is a small constant time interval. Moreover, this constant "Δt" may be determined on the basis of a predetermined cycle in which this routine of the driving torque control process is performed.

In addition, the control process is repeatedly performed by the ECU 10 in a predetermined cycle. Specifically, under the control of the ECU 10, the control process is performed on the basis of the vehicle speed detected by the vehicle speed sensor 6, the driving torque of the engine 1 detected by the torque sensor 5, and the gain of the driving torque. Moreover, the driving torque in the control process is the driving torque which is eventually given to the vehicle 100, and it may be also determined on the basis of the driving torque outputted by the engine 1 (the torque detected by the torque sensor 5). Moreover, the driving torque control process in the embodiment may be performed when not only the front wheels 2f but also the rear wheels 2r run on the bump 30, in the same manner.

As shown in FIG. 5, firstly, the normal gain is set under the control of the ECU 10 (step S101). More specifically, the gain is set only on the basis of feedback control (automatic control) in which the deviation between the measured vehicle speed and the vehicle's target speed is an input value.

Then, under the control of the ECU 10, it is judged whether or not the vehicle is in the stop condition that the vehicle stops in contact with the bump (step S102). In particular, in addition to the judgment of whether or not to be the stop condition, it may be also judged whether or not the vehicle is in an acceleration condition that a driver steps on an accelerator pedal to thereby accelerate the speed, for example. Here, if it is judged that the vehicle is in the stop condition (the step S102: Yes), the variable "TrqGain" is multiplied by the coefficient "K1", and the multiplied value is substituted to the variable "Trq-Gain" (step S103). Specifically, the ECU 10 performs control of opening the throttle valve 4 (setting the opening of the throttle valve 4 to an open side), to thereby increase the amount of the air supplied to the engine 1. By this, it is possible to increase the driving torque outputted by the engine 1. On the other hand, if it is judged that the vehicle is not in the stop condition (the step S102: No), the above-mentioned process in the step S103 is not performed.

Then, the variable "TrqGain" is multiplied by the constant time interval "Δt", and the multiplied value is added to the variable "Trq(n−1)" indicating the driving torque which is given to the vehicle in the "n−1"-th predetermined time interval. The added value is substituted to the variable "Trq(n)" indicating the driving torque which is given to the vehicle in the "n"-th predetermined time interval (step S104).

As described above, in the driving torque control process in the embodiment, if the vehicle is in the stop condition, the gain value is set to the gain at a higher level, obtained by multiplying the normal gain, which is set on the basis of the feedback control, by the coefficient "K1" (wherein "K1" is greater than "1"). As a result, under the control of the ECU, it is possible to make the time length shorter that the driving torque is reached to the driving torque required to drive forward over the bump, for example. Consequently, it is possible to make the time length that the vehicle runs over the bump, shorter (refer to the time point "Ta" in the fourth graph in FIG. 4 described above).

(3) Another Embodiment—ver. 1—

Next, with reference to FIG. 6 and FIG. 7, the driving torque control method or the like in another embodiment (ver. 1) will be explained.

(3-1) Basic Concept of Driving Torque Control Method in Another Embodiment

Next, with reference to FIG. 6, an explanation will be given for the basic concept of the driving torque control method of more quickly increasing the driving torque to the driving torque necessary for the vehicle in another embodiment to run over the bump 30. FIG. 6 is a timing chart to explain the basic concept of the driving torque control method of more quickly increasing the driving torque to the driving torque necessary for the vehicle in another embodiment to run over the bump 30.

Figure 6:
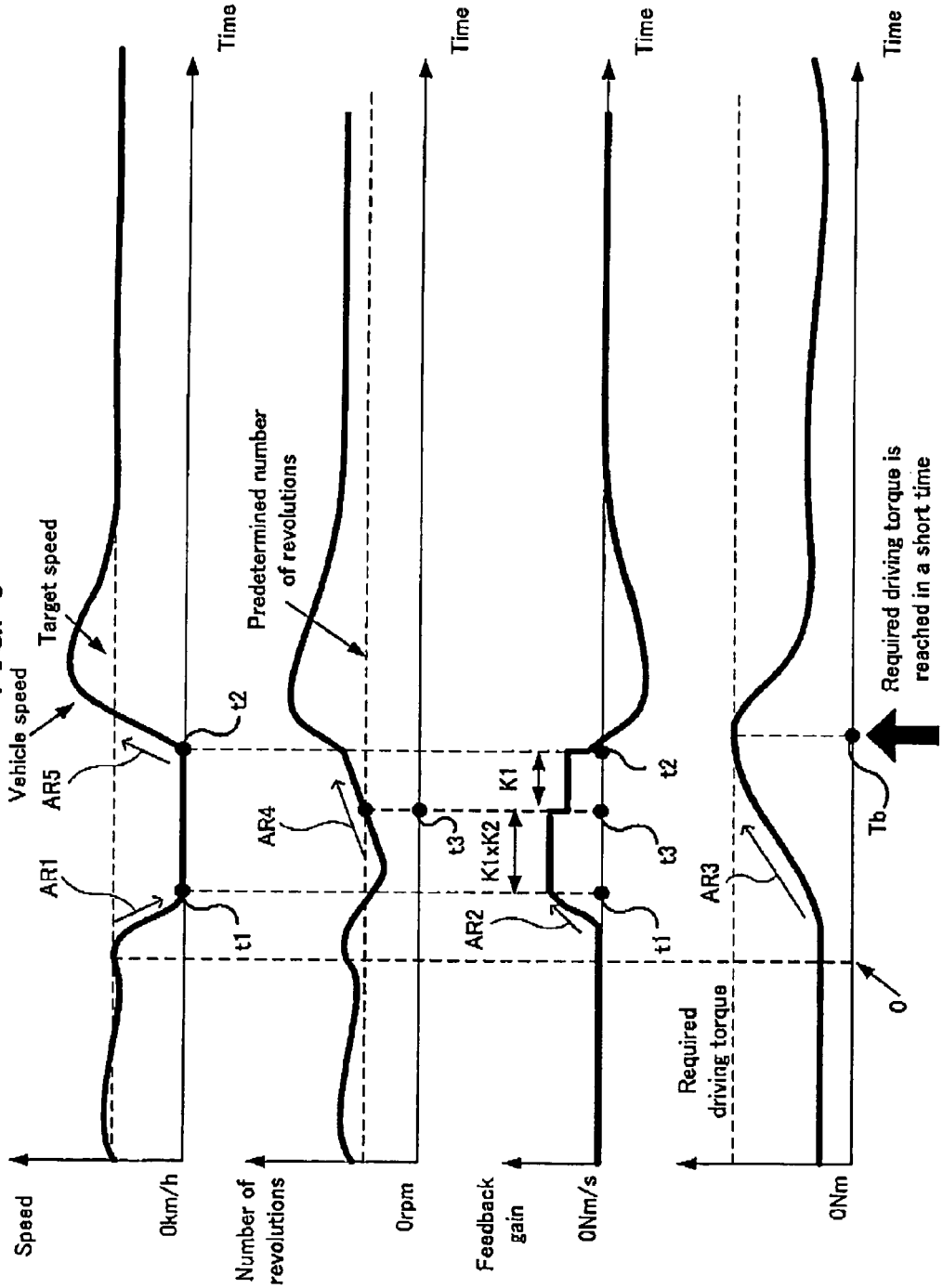
FIG. 6 is a timing chart to explain the basic concept of a driving torque control method of more quickly increasing the driving torque to the driving torque necessary for a vehicle in another embodiment to run over the bump.

Incidentally, a time point "t3" in FIG. 6 indicates the time point that the number of engine revolutions becomes larger than the predetermined number of revolutions. Here, the predetermined number of revolutions in the embodiment is a value determined on the basis of (i) the map information defined by the number of engine revolutions and the height of the bump, (ii) the gear ratio of a transmission, (iii) the vehicle weight, and (iv) the tire diameter of the wheels (the front wheels 2f and the rear wheels 2r), theoretically, experimentally, experientially, and by simulation or the like. Moreover, a time point "Tb" indicates the time point that the required driving torque is reached, in another embodiment. Moreover, the basic structure of the vehicle in another embodiment is the same as that of the first embodiment described above, so that the explanation thereof is omitted. Moreover, in FIG. 6, substantially the same time points as those in FIG. 4 described above carry the same numerical references, and the explanation thereof will be omitted as occasion demands. Moreover, the horizontal axis and the vertical axis in a plurality of graphs in FIG. 6 are the same as those in FIG. 4 described above, so that the explanation thereof will be omitted, as occasion demands.

In particular, in another embodiment, the gain may be highly accurately set at a higher level, on the basis of the extent of the number of engine revolutions (or the extent depending on low or high level of the number of engine revolutions) in addition to the running condition, such as the above-mentioned stop condition. Specifically, for example, the time interval between the time point "t1" and the time point "t2" when the vehicle is in the stop condition may be divided into two time intervals on the basis of whether or not the engine revolutions are lower than the predetermined number of revolutions, to thereby set the gains at different levels in the two time intervals. More specifically, in the time interval between the time point "t1" and the time point "t3" in which the engine revolutions are lower than the predetermined number of revolutions, the gain value may be set to the gain at a higher level, obtained by multiplying the normal gain, which is set on the basis of the above-mentioned feedback control, by the above-mentioned coefficient "K1" and further by a coefficient "K2". Incidentally, the coefficient "K2" (wherein "K2" is larger than "1") is to increase the gain set under the assumption of a low revolution condition. The coefficient "K2" may be determined on the basis of (i) the map information defined by the number of engine revolutions and the height of the bump, (ii) the gear ratio of a transmission, (iii) the vehicle weight, and (iv) the tire diameter of the wheels (the front wheels 2f and the rear wheels 2r), theoretically, experimentally, experientially, and by simulation or the like. On the other than, in the time interval between the time point "t3" and the time point "t2" in which the engine revolutions are higher than the predetermined number of revolutions, the gain value may be set to the gain at another level, obtained by multiplying the normal gain, which is set on the basis of the above-mentioned feedback control by the above-mentioned coefficient "K1".

Consequently, according to the driving torque control method in another embodiment, under the control of the ECU, the gain of the driving torque is highly accurately set at a higher level (i.e. the level obtained by multiplying the normal gain by not only "K1" but also "K2") on the basis of the extent of the number of engine revolutions in addition to the running condition, such as the above-mentioned stop condition, for example. As a result, under the control of the ECU, it is possible to make the time length shorter that the driving torque is reached to the driving torque required to drive forward over the bump, for example. Consequently, it is possible to make the time length that the vehicle runs over the bump, shorter (refer to the time point "Tb" in the fourth graph in FIG. 6).

(3-2) Driving Torque Control Process in Another Embodiment

Next, with reference to FIG. 7, one specific example of the driving torque control process in another embodiment (ver. 1) will be explained. FIG. 7 is a flowchart showing one specific example of the driving torque control process in another embodiment (ver. 1). Incidentally, a coefficient "K3" is to increase the gain set under the assumption of a back condition in which the vehicle is backed. The coefficient "K3" may be determined on the basis of the gear ratio of a transmission, the vehicle weight, and the tire diameter of the wheels (the front wheels 2f and the rear wheels 2r), theoretically, experimentally, experientially, and by simulation or the like. In the control process in another embodiment, substantially the same steps as those in the above-mentioned first embodiment carry the same step numbers, and the explanation thereof will be omitted as occasion demands.

Figure 7:
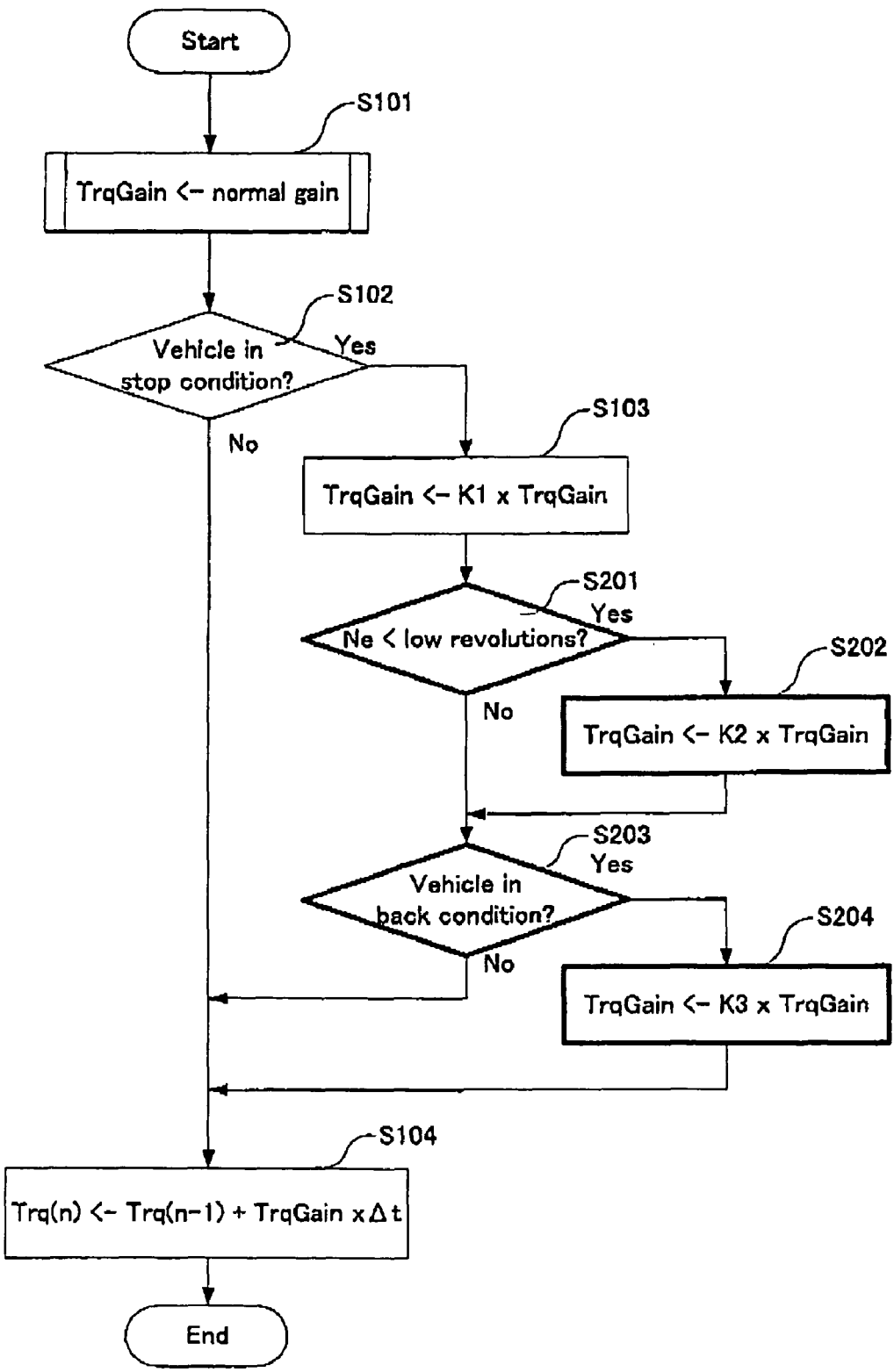
FIG. 7 is a flowchart showing one specific example of the driving torque control process in another embodiment (ver. 1)

As shown in FIG. 7, under the control of the ECU 10, after the above-mentioned step S104, it is judged whether or not the vehicle is in the low revolution condition in which the number of engine revolutions "Ne" is lower than the predetermined number of revolutions (step S201). Here, if it is judged that the vehicle is in the low revolution condition (the step S201: Yes), the variable "TrqGain" is further multiplied by the coefficient "K2", and the obtained value is substituted to the variable "TrqGain" (step S202). On the other hand, if it is judged that the vehicle is not in the low revolution condition (the step S201: No), the above-mentioned step S202 is not performed.

Then, under the control of the ECU 10, it is judged whether or not the vehicle is in the back condition in which at least one of the wheels of the vehicle is reversed in rotation (step S203). Here, if it is judged that the vehicle is in the back condition (the step S203: Yes), the variable "TrqGain" is further multiplied by the coefficient "K3", and the obtained value is substituted to the variable "TrqGain" (step S204). On the other hand, if it is judged that the vehicle is not in the back condition (the step S203: No), the above-mentioned step S204 is not performed.

Consequently, according to the driving torque control process in another embodiment, under the control of the ECU, the gain of the driving torque is highly accurately set at a higher level (i.e. the level obtained by multiplying the normal gain by "K2" and "K3") on the basis of the extent of the number of engine revolutions in addition to the running condition, such as the above-mentioned stop condition and the back condition, for example. As a result, under the control of the ECU, it is possible to make the time length shorter that the driving torque is reached to the driving torque required to drive forward over the bump, for example. Consequently, it is possible to make the time length that the vehicle runs over the bump, shorter (refer to the time point "Tb" in the fourth graph in FIG. 6 described above).

(4) Another Embodiment—ver. 2—

Next, with reference to FIG. 8, the driving torque control process in another embodiment (ver. 2) will be explained.

(4-1) Driving Torque Control Process in Another Embodiment

Next, with reference to FIG. 8, one specific example of the driving torque control process in another embodiment (ver. 2) will be explained. FIG. 8 is a flowchart showing one specific example of the driving torque control process in another embodiment (ver. 2). Incidentally, in the control process in another embodiment (ver. 2), substantially the same steps as those in the above-mentioned another embodiment (ver. 1) carry the same step numbers, and the explanation thereof will be omitted as occasion demands.

Figure 8:
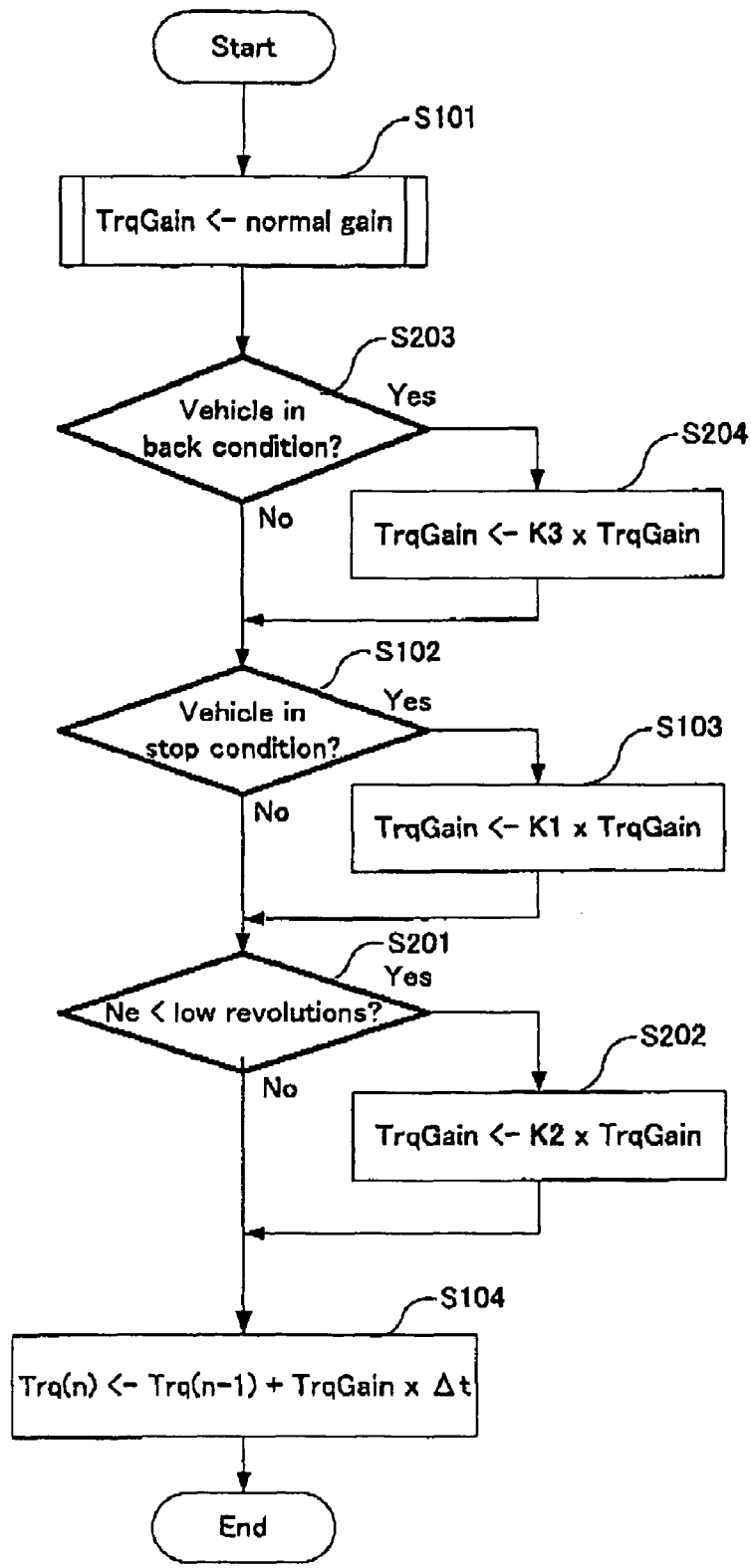
FIG. 8 is a flowchart showing one specific example of the driving torque control process in another embodiment (ver. 2)

As shown in FIG. 8, under the control of the ECU 10, the above-mentioned three judgment processes may be performed in accordance with the descending order of the coefficient by which the normal gain is multiplied (i.e. in accordance with "K3", "K1", and "K2", in which order the value of the coefficient is descending).

Specifically, firstly, under the control of the ECU 10, in accordance with the coefficient "K3", it may be judged whether or not the vehicle is in the back condition in which at least one of the wheels of the vehicle is reversed in rotation (the step S203). Then, in accordance with the coefficient "K1", it may be judged whether or not the vehicle is in the stop condition in which the vehicle stops in contact with the bump (the step S102). Then, in accordance with the coefficient "K2", it may be judged whether or not the vehicle is in the low revolution condition in which the number of engine revolutions of the vehicle is lower than the predetermined number of revolutions (the step S201).

Consequently, according to the driving torque control process in another embodiment (ver. 2), under the control of the ECU, the gain of the driving torque is highly accurately set at a higher level on the basis of the extent of the number of engine revolutions and the extent of necessity to increase the gain out of the running condition, such as the above-mentioned back condition and stop condition, for example. As a result, under the control of the ECU, it is possible to make the time length shorter that the driving torque is reached to the driving torque required to drive forward over the bump, for example. Consequently, it is possible to make the time length that the vehicle runs over the bump, shorter.

(5) Another Embodiment—ver. 3—

(5-1) Basic Structure of Vehicle in Another Embodiment

Next, with reference to FIG. 9, an explanation will be given for the entire structure of the vehicle 100 to which the vehicle control apparatus in another embodiment (ver. 3) is applied.

Figure 9:
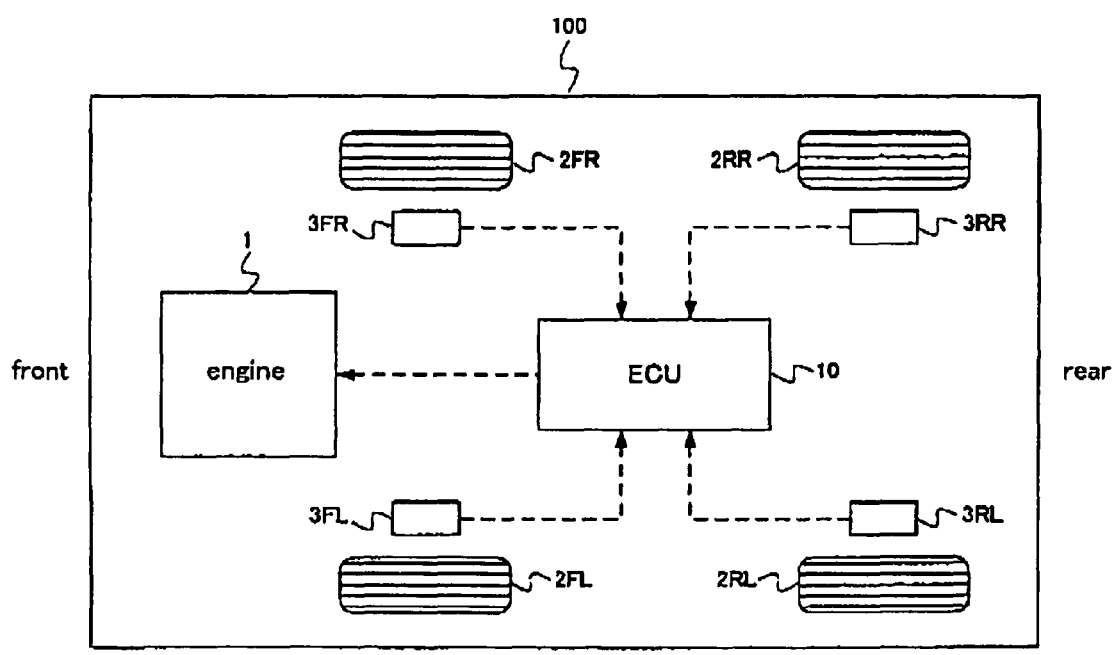
FIG. 9 is a schematic diagram showing the outline structure of a vehicle to which a vehicle control apparatus in an embodiment of the present invention is applied.

FIG. 9 is a schematic diagram showing the outline structure of the vehicle 100. Incidentally, FIG. 9 is a diagram in which the vehicle 100 is observed from the top, the left shows the front of the vehicle 100, and the right shows the rear of the vehicle 100. Moreover, arrows in dashed lines in FIG. 9 indicate the input/output of signals.

The vehicle 100 is provided mainly with: an engine (internal combustion engine) 1; wheels 2FR, 2FL, 2RR, and 2RL; wheel speed sensors 3FR, 3FL, 3RR, and 3RL; and an ECU (Engine Control Unit) 10. Incidentally, hereinafter, the wheels 2FR and 2FL are referred to as "front wheels 2FR and 2FR", and the wheels 2RR and 2RL are referred to as "rear wheels 2RR and 2RL".

The engine 1 is an internal combustion engine for generating power by exploding an air-fuel mixture in a combustion chamber. The power generated by the engine 1 is transmitted to at least any of the front wheels 2FR and 2FR and the rear wheels 2RR and 2RL, through a torque converter, a transmission, and a drive shaft or the like, which are not illustrated. In the engine 1, the generated driving force (hereinafter also referred to as the "driving torque") or the like is controlled by using a control signal supplied from the ECU 10 described later.

The wheel speed sensors 3FR, 3FL, 3RR, and 3RL are sensors for detecting the respective rotational speeds (hereinafter also referred to as "wheel speeds") of the wheels 2FR, 2FL, 2RR, and 2RL. The wheel speed sensors 3FR, 3FL, 3RR, and 3RL supply the detection signals corresponding to the wheel speeds, to the ECU 10.

The ECU 10 has a CPU (Central Processing Unit), a ROM (Read Only Memory), a RAM (Random Access Memory), which are not illustrated, or the like. In the embodiment, the ECU 10 mainly controls the driving torque, which is to be given to the vehicle 100. Specifically, the ECU 10 obtains the wheel speeds detected by the above-mentioned wheel speed sensors 3FR, 3FL, 3RR, and 3RL, and calculates the speed (hereinafter referred to as a "vehicle speed") of the vehicle 100 on the basis of the wheel speeds, and also calculates the acceleration (hereinafter referred to as a "vehicle acceleration") of the vehicle 100. Moreover, the ECU 10 obtains the driving torque, which is to be given to the vehicle 100, on the basis of the calculated vehicle speed and vehicle acceleration. Specifically the ECU 10 obtains the driving torque on the basis of the deviation between the target speed and the vehicle speed. Moreover, in the embodiment, the ECU 10 performs correction of increasing or reducing the obtained driving torque.

Then, the ECU 10 performs control for generating the driving torque obtained in the above manner from the vehicle 100. For example, the ECU 10 performs control of increasing a fuel injection amount if increasing the driving torque, and performs control of increasing a charging pressure if the engine 10 has a supercharger. On the other hand, the ECU 10 performs control of narrowing down the throttle valve (not illustrated) if reducing the driving torque.

As described above, the ECU 10 functions as the vehicle control apparatus in the present invention. Specifically, the ECU 10 operates as the driving force calculating device and the driving force correcting device.

Incidentally, the present invention is not limited to such an example that the ECU 10 calculates the vehicle speed and the vehicle acceleration on the basis of the wheel speeds obtained from the wheel speed sensors 3FR, 3FL, 3RR, and 3RL. In another example, if the vehicle speed sensor and the acceleration sensor (G sensor) or the like are provided in the vehicle, the ECU 10 can obtain the vehicle speed and the vehicle acceleration from those sensors, instead of calculating the vehicle speed and the vehicle acceleration.

(5-2) Driving Torque Correcting Method

Figure 10:
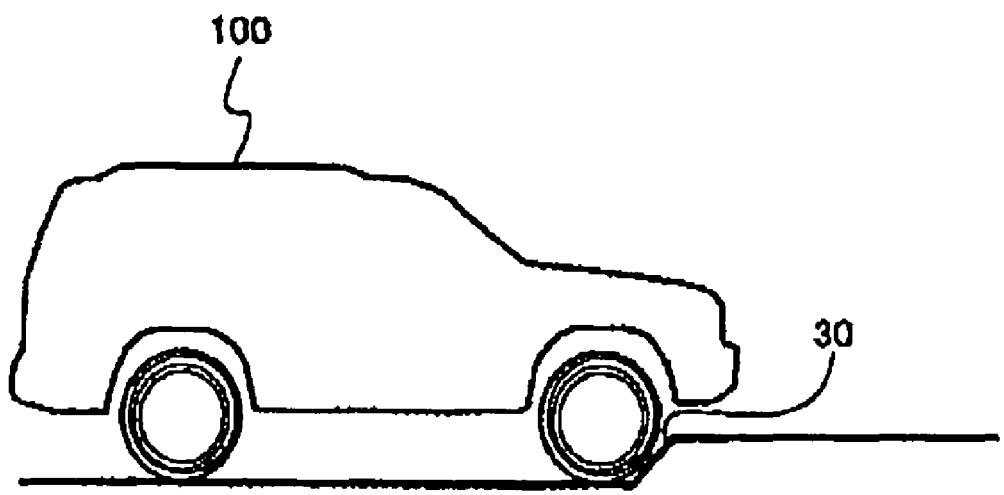
FIG. 10 is a diagram showing the situation that the vehicle comes in contact with an obstacle and stops.

As described above, in another embodiment, the correction is performed on the driving torque obtained on the basis of the deviation between the target speed and the vehicle speed. The driving torque correction is performed when the vehicle 100 stops in contact with the obstacle, such as the bump shown by the numerical reference 30, as shown in FIG. 10. Specifically, when the vehicle 100 stops due to the obstacle, the correction is performed that increases the driving torque obtained on the basis of the deviation between the target speed and the vehicle speed. By this, it is possible to reduce the stop time length that the vehicle 100 stops in contact with the obstacle, and make the vehicle quickly run over the obstacle.

Hereinafter, a driving torque correcting method in another embodiment will be specifically explained.

(5-3) One Example of the Driving Torque Correcting Method (5-3-1) Overview

Next, a overview of the driving torque correcting method in another embodiment (ver. 3) will be explained.

In another embodiment (ver. 3), when the vehicle speed reduces to almost "0" (i.e. when the running vehicle 100 stops), the correction is performed that increases the driving torque. Moreover, the amount of correcting the driving torque is set on the basis of the extent in reduction of the vehicle speed (i.e. the extent of an absolute value of the differential value of the vehicle speed) when the vehicle speed reduces to almost "0". Incidentally, the driving torque correcting method in another embodiment (ver. 3) is performed by the above-mentioned ECU 10.

Figure 11:
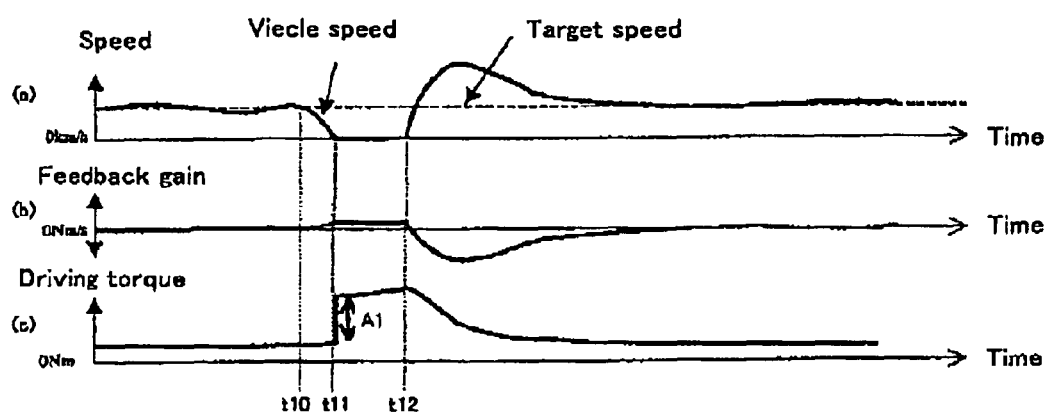
FIG. 11 are diagrams to explain a driving torque correcting method in another embodiment (ver. 3)

FIG. 11 are diagrams to explain the driving torque correcting method in another embodiment (ver. 3). FIG. 11(a) indicates a change of the vehicle speed. A solid line in FIG. 11(a) indicates the vehicle speed, and a dashed line indicates the target speed. Moreover, FIG. 11(b) indicates feedback gain, and FIG. 11(c) indicates required driving torque. The feedback gain is gain used in calculating the driving torque (hereinafter simply referred to as "FB torque") based on the deviation between the vehicle speed and the target speed. Moreover, the required driving torque corresponds to the driving torque which is eventually given to the vehicle 100. Incidentally, FIG. 11(a) to (c) indicate the time on the horizontal axis.

As can be seen from FIG. 11(a), the vehicle speed starts to reduce from a time point t10, and the vehicle speed is almost "0" at a time point t11. Namely, it can be said that the vehicle 100 stops at the time point t11. For example, it is considered that the vehicle 100 stops because the vehicle 100 comes in contact with the obstacle, such as the bump. In this case, the target speed is set to be relatively low, so that the deviation between the target speed and the vehicle speed is small. Thus, as shown in FIG. 11(b), the feedback gain is small after the time point t11.

The ECU 10 performs the correction of increasing the driving torque when the vehicle 100 stops (when the vehicle speed becomes almost "0") as described above. Specifically, the ECU 10 obtains the amount of correcting the FB torque, on the basis of the extent in reduction of the vehicle speed (i.e. the extent of an absolute value of the differential value of the vehicle speed). Then, it is assumed that the torque determined by adding the obtained correction amount to the FB torque is the required driving torque. In this case, as shown in FIG. 11(c), the torque increased only by the amount shown by a numerical reference A1 is regarded as the required driving torque. By giving the required driving torque to the vehicle 100, the vehicle 100 starts to move (the vehicle speed starts to increase from almost "0") at a time point t12. Namely, the vehicle 100 starts to run on or climb the obstacle. After that, the vehicle 100 finishes running over the obstacle, and the vehicle speed reaches the target speed.

Figure 12:
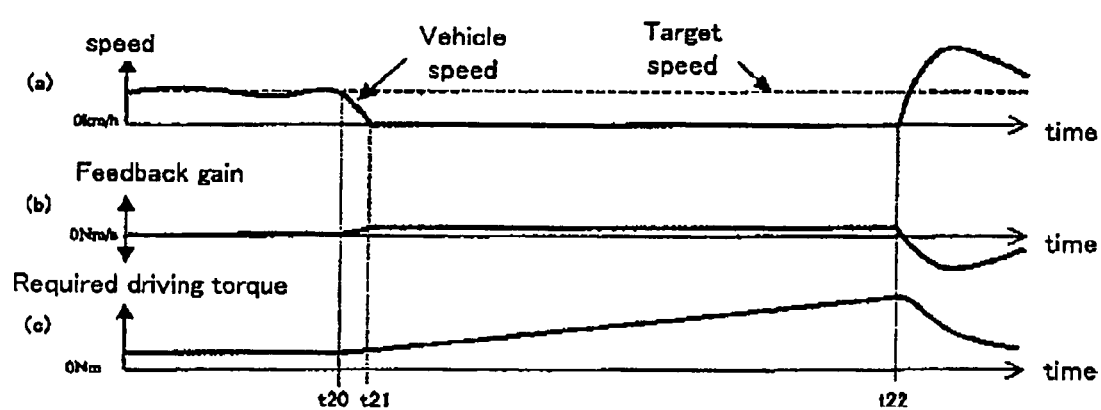
FIG. 12 are diagrams to explain a driving torque correcting method in a comparison example.

Here, with reference to FIG. 12, an explanation will be given for an example in which the correction is not performed that increases the driving torque when the vehicle stops (hereinafter referred to as a "comparison example"). In the comparison example, the correction is not performed on the FB torque, and the FB torque obtained on the basis of the deviation between the target speed and the vehicle speed is given to the vehicle as it is.

FIG. 12(a) indicates a change in the vehicle speed. A solid line in FIG. 12(a) indicates the vehicle speed, and a dashed line indicates the target speed. Moreover, FIG. 12(b) indicates feedback gain, and FIG. 12(c) indicates required driving torque. Incidentally, FIG. 12(a) to (c) indicate the time on the horizontal axis.

As can be seen from FIG. 12(a), the vehicle speed starts to reduce from a time point t20, and the vehicle speed is almost "0" at a time point t21. For example, the vehicle speed is almost "0" because the vehicle comes in contact with the obstacle, such as the bump. In this case, the target speed is set to be relatively low, so that the deviation between the target speed and the vehicle speed is small. Thus, as shown in FIG. 12(b), the feedback gain is small after the time point t21. In this case, it is considered that the FB torque calculated on the basis of the feedback gain increases slowly. In the comparison example, the FB torque itself is set as the required driving torque, so that the required driving torque increases slowly, as shown in FIG. 12(c). Namely, it takes a time for the required driving torque to increase. If such required driving torque is given to the vehicle, finally, at a time point t22 which is a certain degree (or longer degree) of time after the time point t21, the vehicle starts to run on or climb the obstacle.

As described above, as compared to (i) the control in another embodiment (ver. 3) in which the correction of increasing the driving torque is performed when the vehicle 100 stops and (ii) the control in the comparison example in which the correction of increasing the driving torque is not performed when the vehicle 100 stops, it can be seen that the time length that the vehicle 100 runs over the obstacle is shorter in the case where the control in another embodiment (ver. 3) is performed. Namely, according to the control in another embodiment (ver. 3), it can be said that it is possible to reduce the stop time length of the vehicle 100 due to the contact with the obstacle.

Next, a process of a driving torque correcting process in another embodiment (ver. 3) will be explained.

(5-3-2) Correcting Process

Next, one example of the process of the driving torque correcting method in another embodiment (ver. 3) will be explained.

Figure 13:
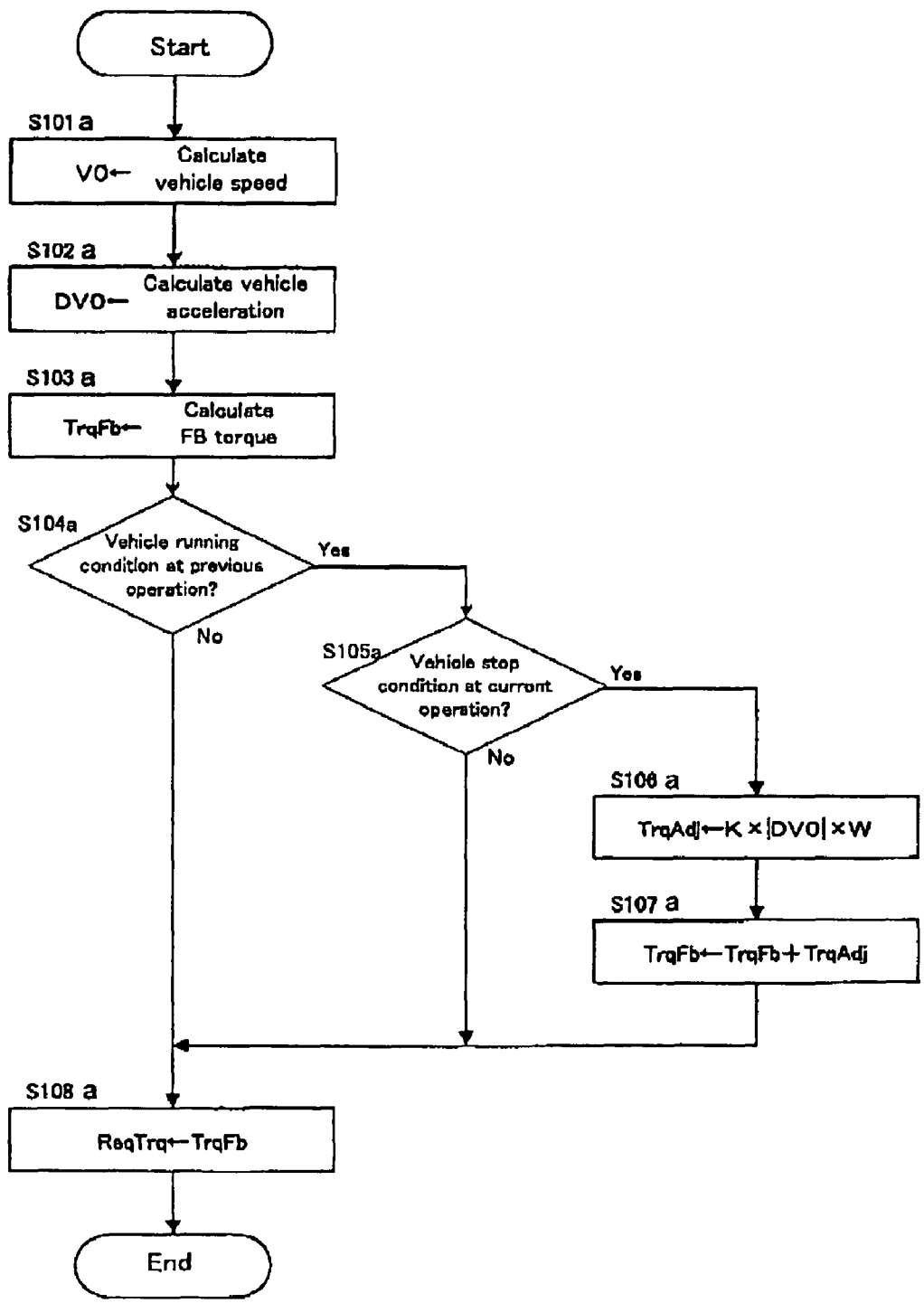
FIG. 13 is a flowchart showing a driving torque correcting process in another embodiment (ver. 3)

FIG. 13 is a flowchart showing the driving torque correcting process in another embodiment (ver. 3). This process is repeatedly performed in a predetermined cycle by the ECU 10.

Firstly, in a step S101a, the ECU 10 calculates a vehicle speed V0. Specifically, the ECU 10 obtains the wheel speeds detected by the wheel speed sensors 3FR, 3FL, 3RR, and 3RL, and calculates the vehicle speed V0 on the basis of the detected wheel speeds. Then, the process goes to a step S102a.

In the step S102a, the ECU 10 calculates a vehicle acceleration DV0. Specifically, the ECU 10 obtains the wheel speeds detected by the wheel speed sensors 3FR, 3FL, 3RR, and 3RL, and calculates the vehicle acceleration DV0 on the basis of the detected wheel speeds. Then, the process goes to a step S103a.

In the step S103a, the ECU 10 calculates FB torque TrqFb. Specifically, the ECU 10 calculates the feedback gain from a difference between the target speed and the vehicle speed V0, and obtains the FB torque TrqFb by using the calculated feedback gain. Then, the process goes to a step S104a.

In the step S104a, the ECU 10 judges whether or not the vehicle was in the running condition at the previous operation. Specifically, the ECU 10 judges whether or not the vehicle speed "V0>0" (i.e., V0 is greater than "0") when the flow is performed previously. If the vehicle was in the running condition (the step S104a: Yes), the process goes to a step S105a. On the other hand, if the vehicle was not in the running condition (the step S104a: No), the process goes to a step S108a. In this case, it cannot be said that the vehicle 100 in motion stops due to the obstacle. Thus, the process of correcting the FB torque TrqFb is not performed.

In the step S105a, the ECU 10 judges whether or not the vehicle is in the stop condition at the current operation. Specifically, the ECU 10 judges whether or not the vehicle speed "V0=0" (i.e., V0 is equal to "0") at the current time. If the vehicle is in the stop condition (the step S105a: Yes), the process goes to a step S106a. In this case, the vehicle 100 in motion has highly likely stopped due to the obstacle or the like. Thus, the process for correcting the FB torque TrqFb is performed in the process after the step S106a. On the other hand, if the vehicle is not in the stop condition (the step S105a: No), the process goes to the step S108a. In this case, the vehicle 100 is in motion. Thus, the process of correcting the FB torque TrqFb is not performed.

In the step S106a, the ECU 10 calculates a torque correction amount TrqAdj, on the basis of the vehicle acceleration DV0 (using the absolute value). Specifically, the ECU 10 calculates the torque correction amount TrqAdj on the basis of the following equation (1).

$$TrqAdj = K \times |DV0| \times W \quad (1)$$

In the equation (1), "K" indicates a torque correction coefficient, and "W" indicates a vehicle weight. The torque correction coefficient "K" indicates the extent of correcting the torque. The equation (1) indicates that (i) the larger that the vehicle acceleration "DV0" is, (ii) the larger that the torque correction amount TrqAdj is. In this case, if the correction is performed under the assumption of "K=1" (i.e., K is equal to "1"), the torque minimum necessary for the vehicle 100 to run over the obstacle is obtained. Moreover, if the correction is performed under the assumption of "K>1" (i.e., K is grater than "1"), the torque is obtained that allows the vehicle to certainly run over the obstacle without an influence of running resistance. As shown in the equation (1), by calculating the torque correction amount TrqAdj on the basis of the vehicle acceleration DV0, it is possible to correct the FB torque TrqFb in accordance with the condition of the obstacle's height and shape or the like. Namely, without an influence of the obstacle's condition, it is possible to give the vehicle 100 the driving torque that allows the vehicle 100 to certainly run over the obstacle. If the above-mentioned process in the step S106 is ended, the process goes to a step S107a.

In the step S107a, the ECU 10 corrects the FB torque TrqFb on the basis of the torque correction amount TrqAdj obtained in the step S106a. Specifically, the torque obtained by adding the torque correction amount TrqAdj to the FB torque TrqFb calculated in the step S103 is set as the FB torque TrqFb after the correction. Then, the process goes to the step S108.

In the step S108, the ECU 10 obtains required driving torque ReqTrq on the basis of the FB torque TrqFb. Specifically, the ECU 10 sets the FB torque TrqFb obtained in the above-mentioned process, as the required driving torque ReqTrq. If the vehicle 100 stops due to the obstacle (the step S104a: Yes, and the step S105: Yes), the FB torque TrqFb corrected by using the torque correction amount TrqAdj in the step S106a and the step S107a is set to the required driving torque. On the other hand, if the vehicle 100 does not stop due to the obstacle (the step S104a: No or the step S105: No), the FB torque TrqFb calculated in the step S103 is set to the required driving torque, as it is. If the above-mentioned process is ended, the process escapes from the flow. In this case, the ECU 10 performs the control on the engine 1 or the like so that the required driving torque ReqTrq calculated by the execution of the flow is outputted from the vehicle 100.

As described above, according to the driving torque correcting process in another embodiment (ver. 3), it is possible to certainly make the vehicle 100 run over the obstacle in a short time, without an influence of the obstacle's condition or the like.

(6) Another Embodiment—ver. 4—

Next, the driving torque correcting method in another embodiment (ver. 4) will be explained.

Another embodiment (ver. 4) is different from another embodiment (ver. 3) in the point that the correction of reducing the driving force is performed when the vehicle speed reaches the target speed, by performing the correction of increasing the driving torque. Specifically, in another embodiment (ver. 4), the amount of correcting the driving force is set to "0" when the vehicle speed reaches the target speed after the correction of increasing the driving force. By this, it is possible to prevent the vehicle speed from greatly exceeding the target speed after the vehicle 100 runs over the obstacle or the like. In other words, it is possible to maintain the vehicle speed at the target speed, immediately after the vehicle 100 runs over the obstacle or the like. Incidentally, the driving torque correcting method in another embodiment (ver. 4) is also performed by the above-mentioned ECU 10.

Figure 14:
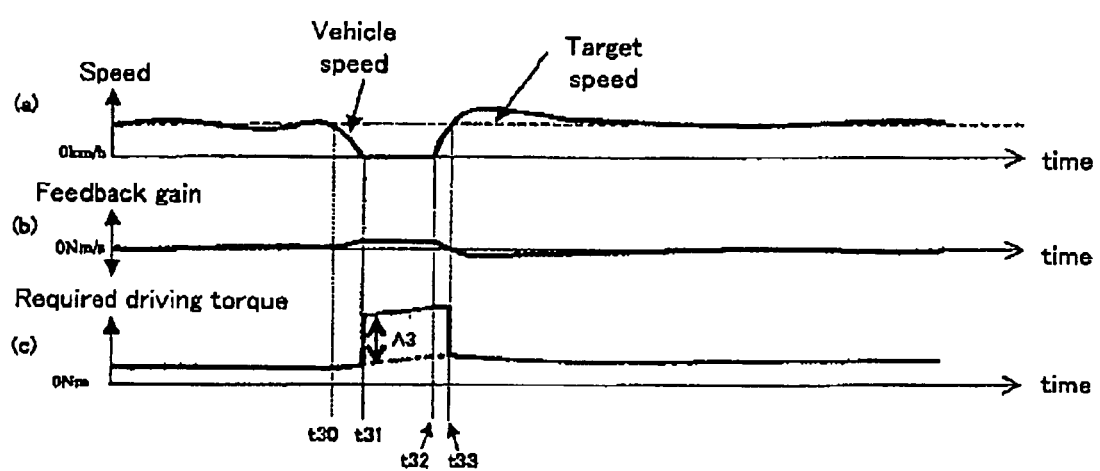
FIG. 14 are diagrams to explain a driving torque correcting method in another embodiment (ver. 4)

FIG. 14 are diagrams to explain the driving torque correcting method in another embodiment (ver. 4).

FIG. 14(a) indicates a change in the vehicle speed. A solid line in FIG. 14(a) indicates the vehicle speed, and a dashed line indicates the target speed. Moreover, FIG. 14(b) indicates feedback gain, and FIG. 14(c) indicates required driving torque. Incidentally, FIG. 14(a) to (c) indicate the time on the horizontal axis.

As can be seen from FIG. 14(a), the vehicle speed starts to reduce from a time point t30, and the vehicle speed is almost "0" (i.e. the vehicle 100 stops) at a time point t3a. For example, it can be considered that the vehicle speed is almost "0" because the vehicle 100 comes in contact with the obstacle, such as the bump. The ECU 10 performs the correction of increasing the driving torque when the vehicle 100 stops as described above. Specifically, the ECU 10 obtains the amount of correcting the FB torque on the basis of the extent in reduction of the vehicle speed, and sets the torque obtained by adding the obtained correction amount to the FB torque, as the required driving torque. In this case, as shown in FIG. 14(c), the torque increased only by the amount shown by a numerical reference A3, is regarded as the required driving torque. By giving the required driving torque to the vehicle 100, the vehicle 100 starts to move at a time point t32. Namely, the vehicle 100 starts to run on or climb the obstacle.

After that, the vehicle speed reaches the target speed at a time point t33. At this time, the ECU 10 sets the amount of correcting the driving force to "0". By this, as shown in FIG. 14(c), the required driving torque is reduced to the FB torque calculated only by using the feedback gain, at the time point t33. Then, after the time point t33, as shown in FIG. 14(a), the vehicle speed reduces to the target speed without greatly exceeding the target speed, and the vehicle speed is maintained to the target speed.

As described above, according to the driving torque correcting method in another embodiment (ver. 4), it is possible to reduce the stop time length that the vehicle 100 stops due to the contact with the obstacle. It is also possible to prevent the vehicle speed from greatly exceeding the target speed after the vehicle runs over the obstacle.

Next, the driving torque correcting process in another embodiment (ver. 4) will be explained.

Figure 15:
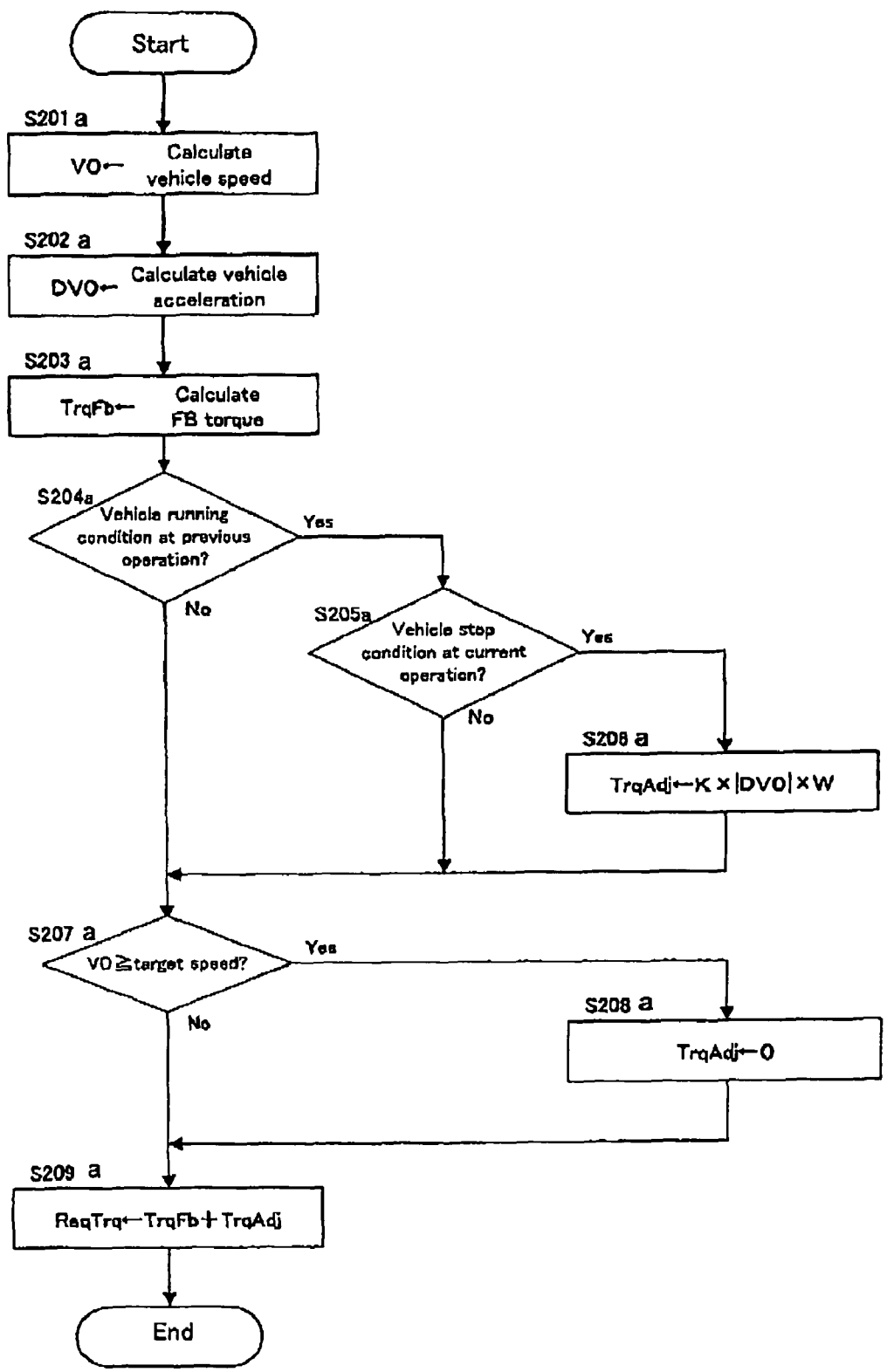
FIG. 15 is a flowchart showing a driving torque correcting process in another embodiment (ver. 4).

FIG. 15 is a flowchart showing the driving torque correcting process in another embodiment (ver. 4). This process is also repeatedly performed in a predetermined cycle by the ECU 10.

The driving torque correcting process in another embodiment (ver. 4) is different from the driving torque correcting process in another embodiment (ver. 3) in the point that the torque correction amount TrqAdj is set to "0" when the vehicle speed V0 exceeds the target speed. Specifically, the processes in steps S201a to S206a are the same as those in the steps S101a to S106a in the driving torque correcting process in another embodiment (ver. 3) (refer to FIG. 13), so that the explanation thereof is omitted. Hereinafter, the process after a step S207 will be explained. Incidentally, it is assumed that the torque correction amount TrqAdj is initially set to "0" when the flowchart shown in FIG. 15 is started.

In the step S207a, the ECU 10 judges whether or not the vehicle speed V0 is greater than or equal to the target speed. In the step S207a, it is judged whether or not it is in the situation to set the torque correction amount TrqAdj to "0". If the vehicle speed V0 is greater than or equal to the target speed (the step S207a: Yes), the process goes to a step S208a, and if the vehicle speed V0 is less than the target speed (the step S207a: No), the process goes to a step S209a.

In the step S208a, the vehicle speed V0 is greater than or equal to the target speed, so that the ECU 10 sets the torque correction amount TrqAdj to "0". In this case, the ECU 10 sets the torque correction amount TrqAdj calculated in the step S206a to "0". Incidentally, if the process in the step S206a is not performed, the torque correction amount TrqAdj is maintained to "0" set in the initial setting. If the process of the step S208 described above is ended, the process goes to a step S209a.

In the step S209a, the ECU 10 corrects the FB torque TrqFb on the basis of the torque correction amount TrqAdj, to thereby obtain the required driving torque ReqTrq. Specifically, the torque obtained by adding the torque correction amount TrqAdj to the FB torque TrqFb calculated in the step S203a, is set as the required driving torque ReqTrq. Specifically, if the vehicle speed V0 is greater than or equal to the target speed (the step S207a: Yes), the torque correction amount TrqAdj is "0". Thus, the FB torque TrqFb itself calculated in the step S203a is regarded as the required driving torque ReqTrq. On the other hand, if the vehicle speed V0 is less than the target speed (the step S207a: No), the torque obtained by adding the torque correction amount TrqAdj calculated in the step S206a and the FB torque TrqFb itself calculated in the step S203a, is regarded as the required driving torque ReqTrq. Incidentally, in the case where the vehicle speed V0 is less than the target speed, if the process of the step S206a is not performed, the torque correction amount TrqAdj is maintained to "0" set in the initial setting. Thus, the FB torque TrqFb itself calculated in the step S203a, is regarded as the required driving torque ReqTrq.

If the above-mentioned process of the step S209a is ended, the process escapes from the flow. In this case, the ECU 10 performs the control on the engine 1 or the like so that the required driving torque ReqTrq calculated by the execution of the flow is outputted from the vehicle 100.

As described above, according to the driving torque correcting process in another embodiment (ver. 4), it is possible to reduce the time length required to run over the obstacle. At the same time, it is possible to prevent the vehicle speed from greatly exceeding the target speed, after the vehicle runs over the obstacle or the like, and it is possible to maintain the vehicle speed at the target speed.

Incidentally, the embodiment of correcting the driving torque when the vehicle 100 stops (when the vehicle speed reduces to almost "0") is shown in the above, however, the present invention is not limited to this. In another example, it is possible to correct the driving torque when the vehicle speed reduces to a predetermined value. By this, it is possible to further reduce the time length required for the vehicle 100 to run over the obstacle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2005-377407 filed on Dec. 28, 2005 and Japanese Patent Application No. 2006-145675 filed on May 25, 2006 including the specification, claims, drawings and summary is incorporated herein by reference in its entirety.

What is claimed is:

1. A vehicle control apparatus comprising:
   a measuring device for measuring a vehicle speed of a vehicle;
   a gain setting device for setting gain for determining an increasing rate of driving torque which is given to the vehicle, on the basis of the measured vehicle speed;
   a running condition judging device for judging a running condition of the vehicle, including a stop condition in which the vehicle stops in contact with a bump; and
   a gain controlling device for controlling said gain setting device in order to set the gain as normal gain based on a deviation between the measured vehicle speed and the target speed, or another gain being different from the normal gain, on the basis of whether or not the judged running condition is the stop condition.

2. The vehicle control apparatus according to claim 1, wherein
said running condition judging device judges whether or not the vehicle is in the stop condition, and
said gain controlling device increases the gain by a first ratio if it is judged that the vehicle is in the stop condition.

3. The vehicle control apparatus according to claim 1, further comprising a number-of-revolutions measuring device for measuring the number of engine revolutions of the vehicle,
said running condition judging device judging whether the vehicle is in a low revolution condition in which the measured number of engine revolutions is lower than predetermined number of revolutions,
said gain controlling device further increasing the gain by a second ratio if it is judged that the vehicle is in the low revolution condition.

4. The vehicle control apparatus according to claim 1, wherein
said running condition judging device judges whether the vehicle is in a back condition in which the vehicle moves backward, and
said gain controlling device further increases the gain by a third ratio if it is judged that the vehicle is in the back condition.

5. The vehicle control apparatus according to claim 1, wherein
the vehicle comprises a plurality of wheels, and
said running condition judging device judges that the vehicle is in the stop condition (i) if the vehicle speed is equal to almost zero, or (ii) if at least one of the plurality of wheels is reversed in rotation.

6. The vehicle control apparatus according to claim 1, wherein said gain controlling device increases the gain on the basis of the number of engine revolutions of the vehicle.

7. The vehicle control apparatus according to claim 1, further comprising an acceleration judging device for performing acceleration judgment of whether or not a driver of the vehicle performs an acceleration operation,
said gain controlling device further increasing the gain on the basis of the acceleration judgment.

8. The vehicle control apparatus according to claim 1, further comprising a target speed setting device for setting a target speed of the vehicle,
said gain setting device setting the gain on the basis of feedback control in which a deviation between the measured vehicle speed and the target speed is an input value.

9. The vehicle control apparatus according to claim 1, wherein said gain controlling device increases the gain on the basis of the judged running condition.

10. The vehicle control apparatus according to claim 1, further comprising a number-of-revolutions measuring device for measuring the number of engine revolutions of the vehicle,
said running condition judging device further judging whether the vehicle is (i) in a low revolution condition in which the measured number of engine revolutions is lower than predetermined number of revolutions, or (ii) in a back condition in which the vehicle moves backward, as the running condition.

* * * * *